Figure 3:
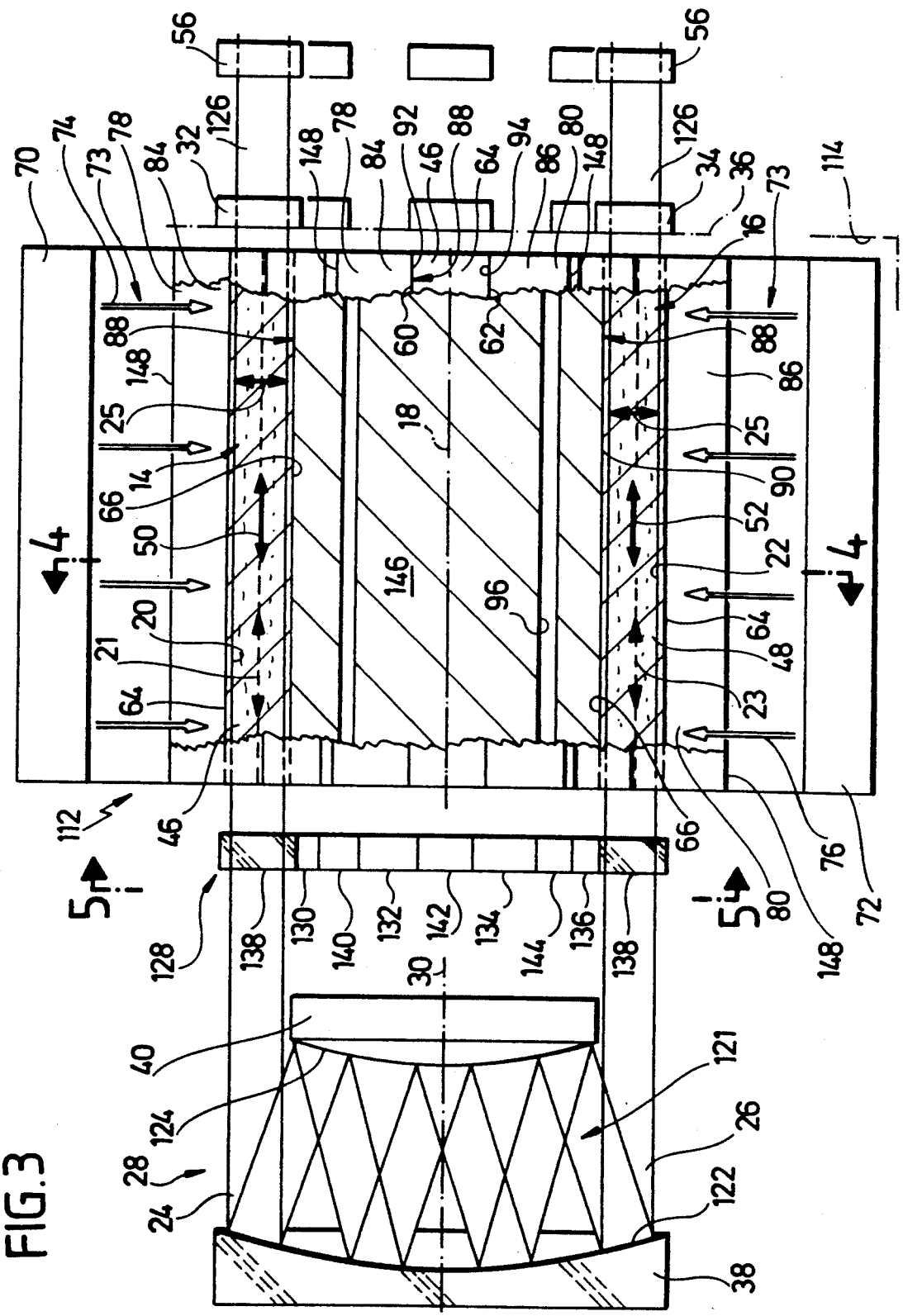

United States Patent [19]

Opower

[11] Patent Number: 5,206,874
[45] Date of Patent: Apr. 27, 1993

[54] SOLID-STATE LASER

[75] Inventor: Hans Opower, Krailling, Fed. Rep. of Germany

[73] Assignee: Deutsche Forschungsanstalt, Bonn, Fed. Rep. of Germany

[21] Appl. No.: 838,303

[22] PCT Filed: Jul. 17, 1991

[86] PCT No.: PCT/DE91/00595
§ 371 Date: Mar. 6, 1992
§ 102(e) Date: Mar. 6, 1992

[87] PCT Pub. No.: WO92/02062
PCT Pub. Date: Feb. 6, 1992

[30] Foreign Application Priority Data

Jul. 18, 1990 [DE] Fed. Rep. of Germany ....... 4022818

[51] Int. Cl.$^5$ .............................................. H01S 3/093
[52] U.S. Cl. .......................................... 372/72; 372/97
[58] Field of Search ................... 372/72, 97, 99, 34, 372/36

[56] References Cited

U.S. PATENT DOCUMENTS

| 3,431,511 | 3/1969 | Fyler . |
| 3,614,659 | 10/1971 | Rigrod . |
| 3,628,180 | 12/1971 | Segre ..................... 372/97 |
| 4,025,172 | 5/1977 | Freiberg ................ 372/97 |
| 4,123,150 | 10/1978 | Sziklas ................... 372/97 |
| 4,126,381 | 11/1978 | Chodzko et al. . |
| 4,429,394 | 1/1984 | Guch, Jr. . |
| 4,864,587 | 9/1989 | Javan .................... 372/97 |

FOREIGN PATENT DOCUMENTS

| 1589887 | 4/1970 | Fed. Rep. of Germany . |
| 2029742 | 12/1971 | Fed. Rep. of Germany . |
| 3546554 | 9/1987 | Fed. Rep. of Germany . |
| 3829812 | 3/1990 | Fed. Rep. of Germany . |
| 1396497 | 3/1965 | France . |
| 2282176 | 3/1976 | France . |

OTHER PUBLICATIONS

Mumola, et al., "Unstable Resonators for Annular Gain Volume Lasers", *Applied Optics*, vol. 17, No. 6, Mar. 15, 1978.

Primary Examiner—Akm E. Ullah
Assistant Examiner—Robert E. Wise
Attorney, Agent, or Firm—Barry R. Lipsitz

[57] ABSTRACT

In order to improve a solid-state laser comprising a resonator, at least one solid-state rod arranged in the resonator and a pumping power source for exciting the solid-state rod such that the dissipation heat can be controlled better and excitation for high powers is possible in a simple way, it is proposed that the resonator be a coupled resonator, that the resonator have two elongated excitation sections lying in one plane with one of the solid-state rods being arranged in their respective beam, that the resonator have a coupling section which the beams of the excitation sections enter as outer beams extending parallel to one another but in spaced relation to one another and which couples the excitation sections with one another by displacement of the outer beams in the plane defined by these to a coupling axis lying parallel to and between the outer beams and beyond this coupling axis, and that irradiated by the pumping power source on another side surface.

74 Claims, 15 Drawing Sheets

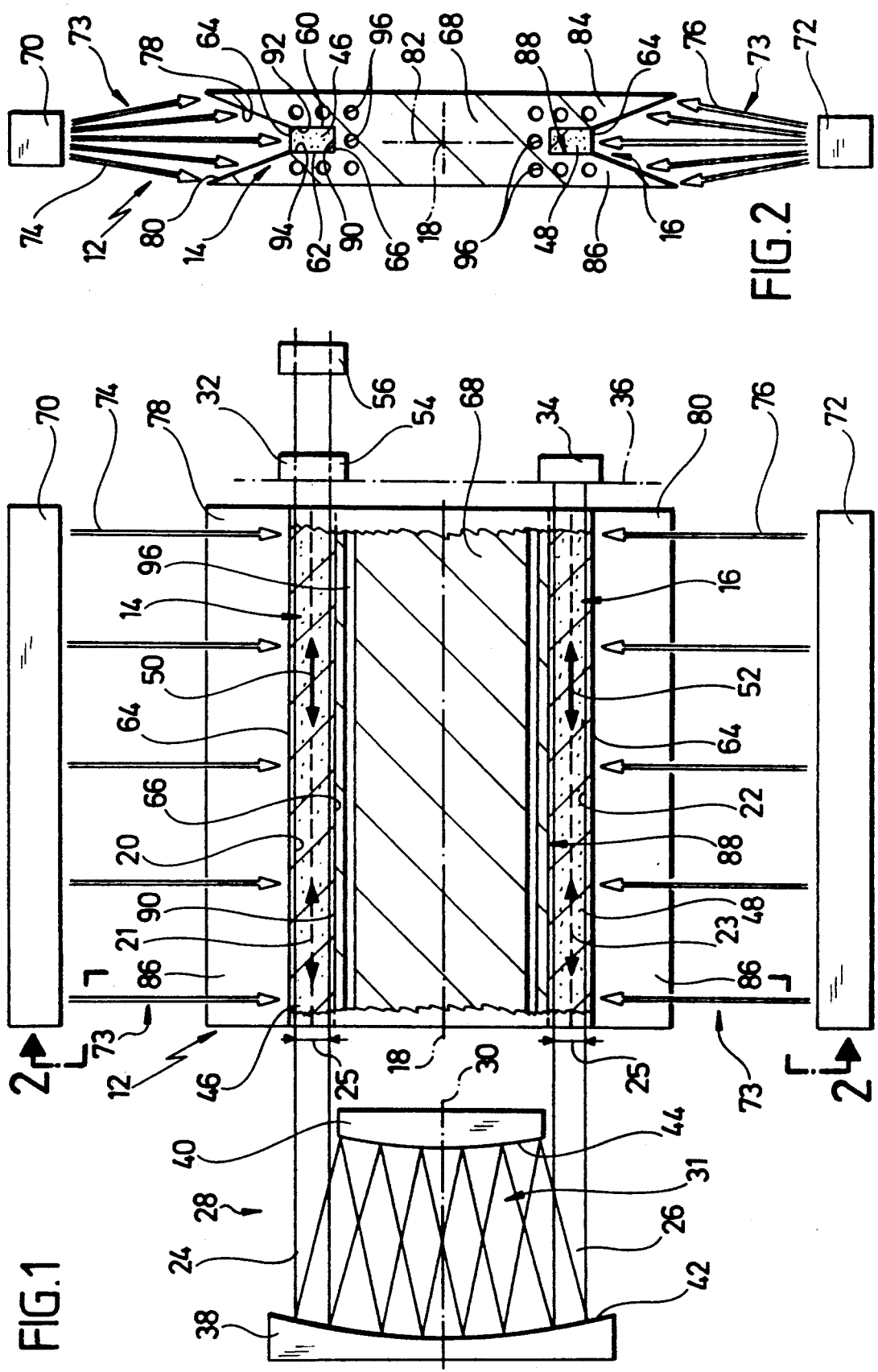

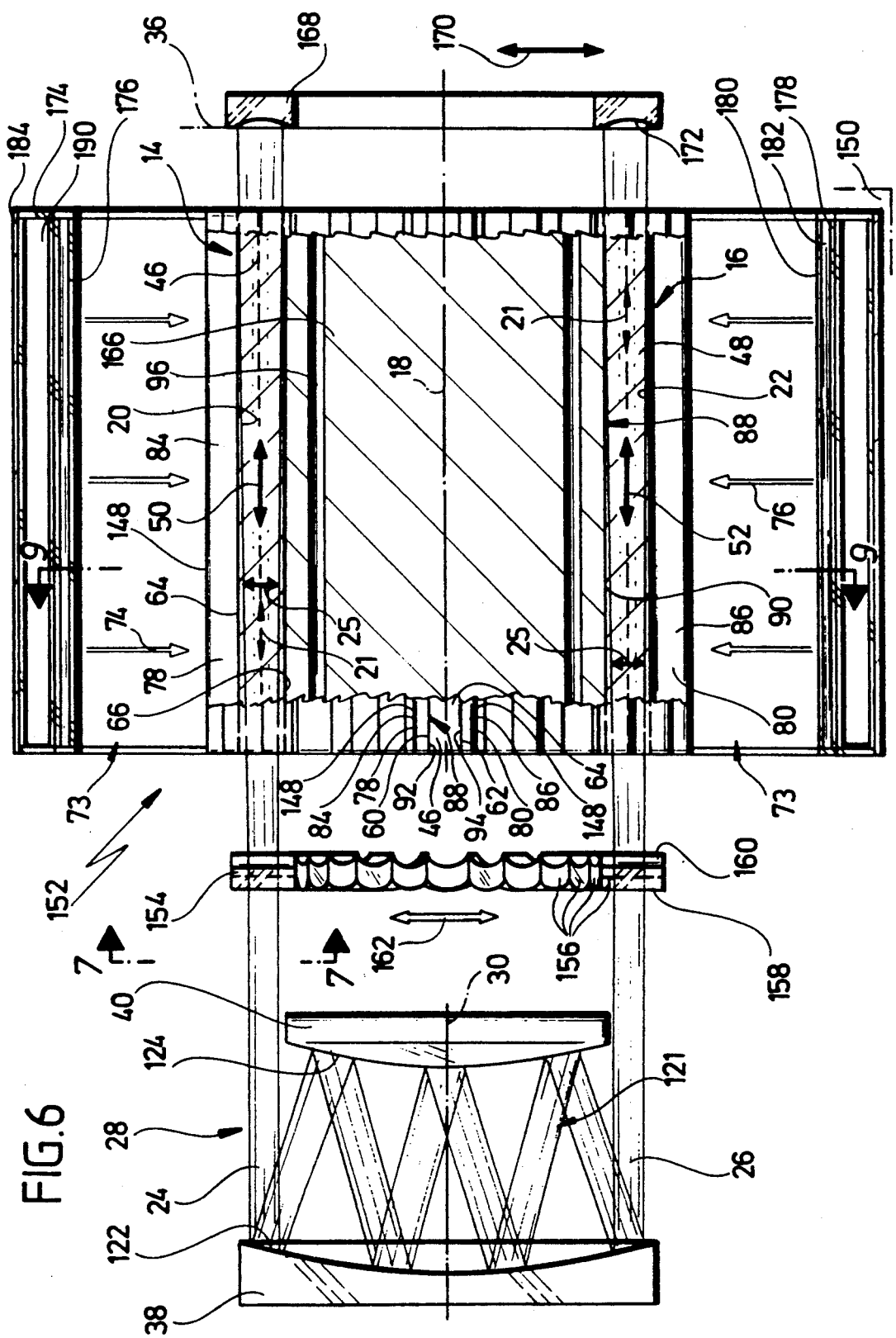

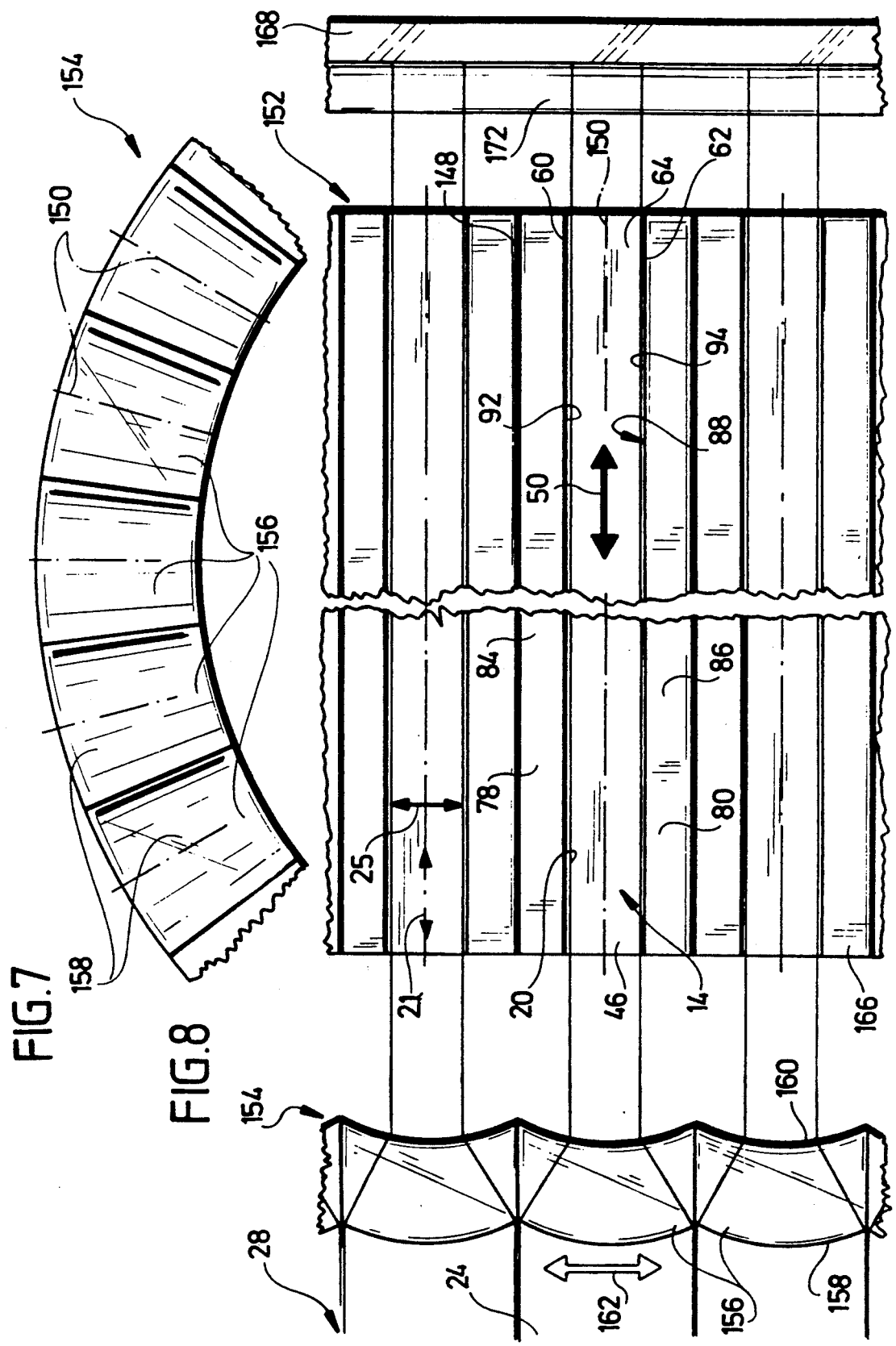

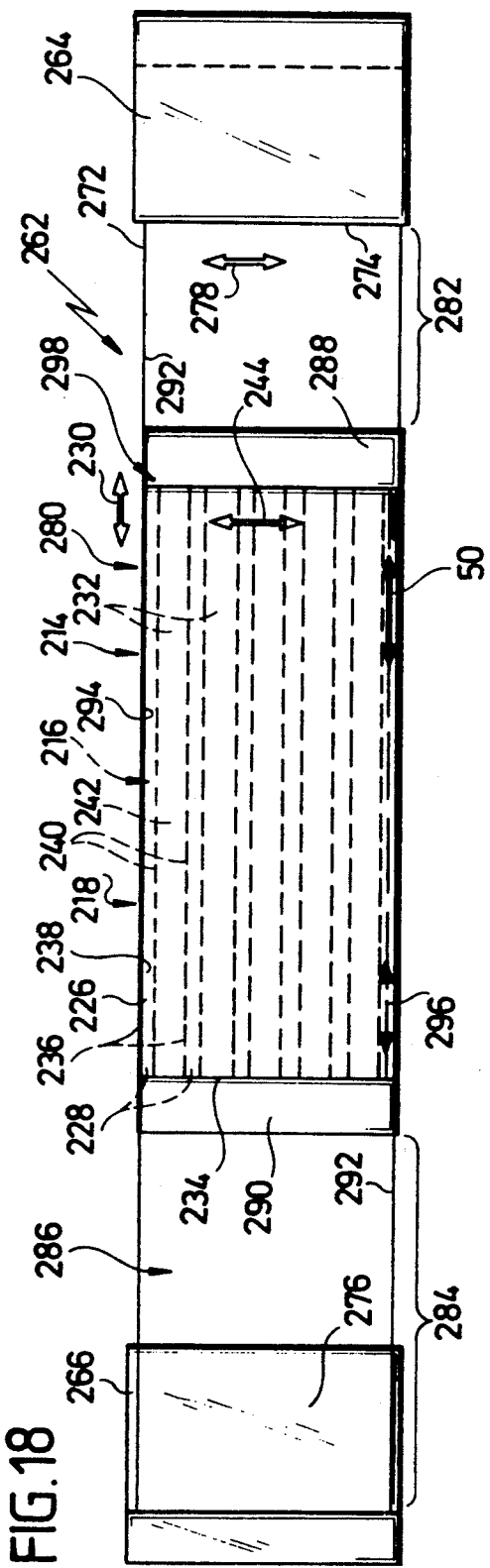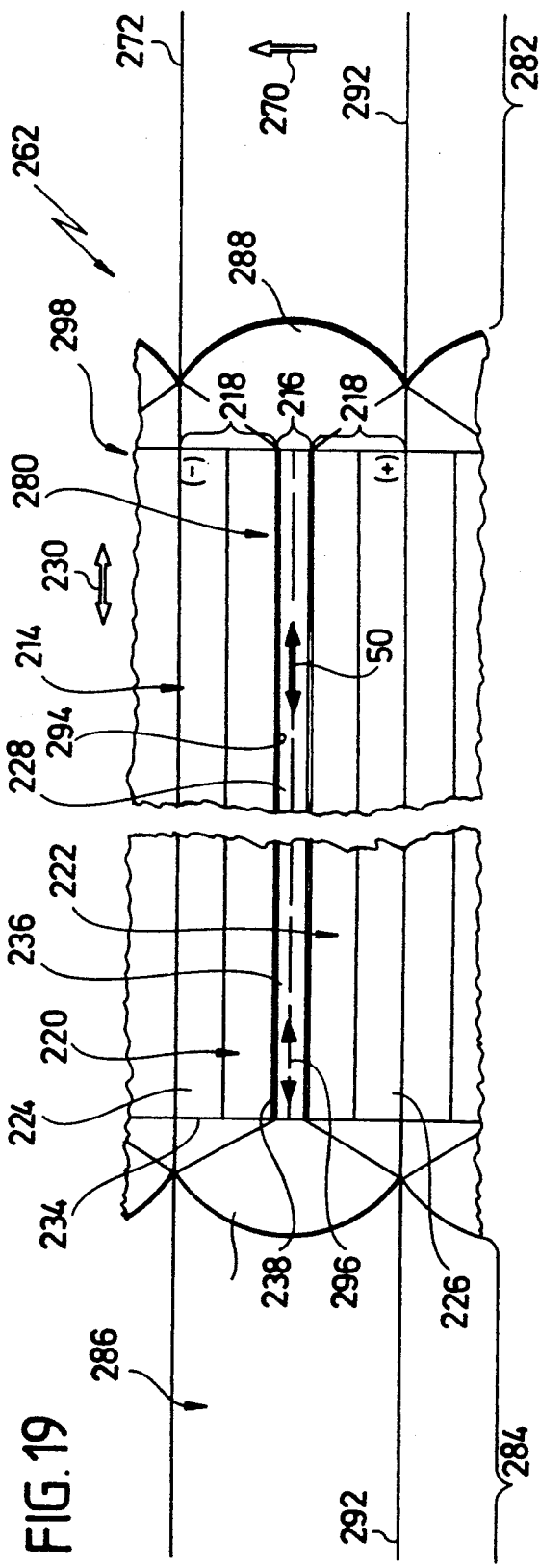
FIG. 18
FIG. 19

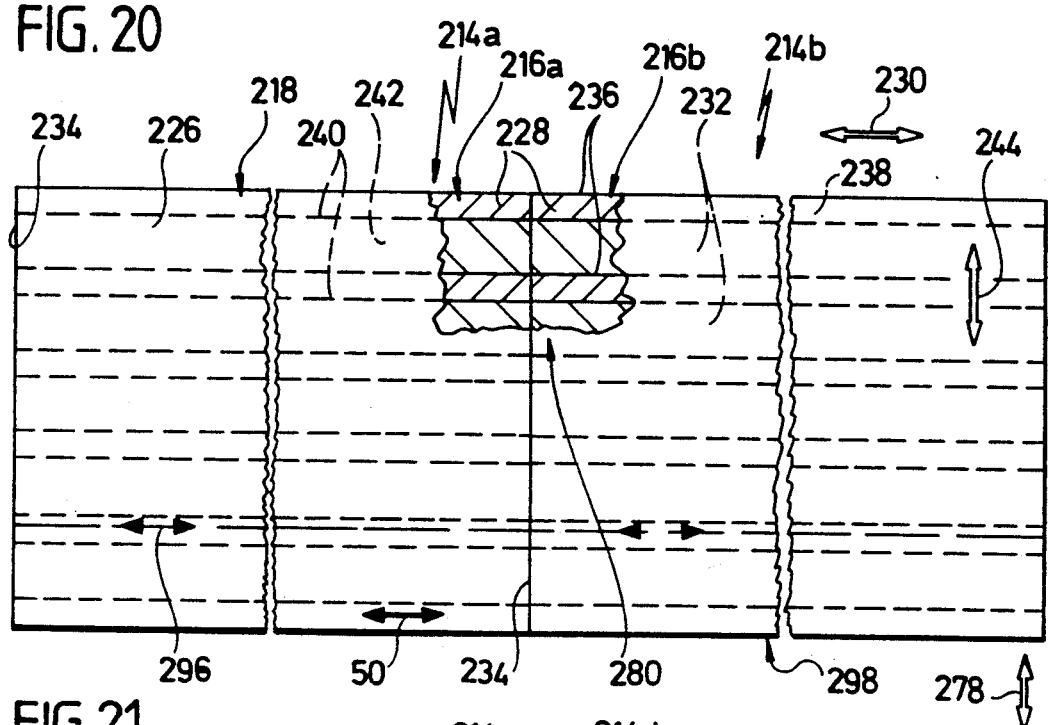
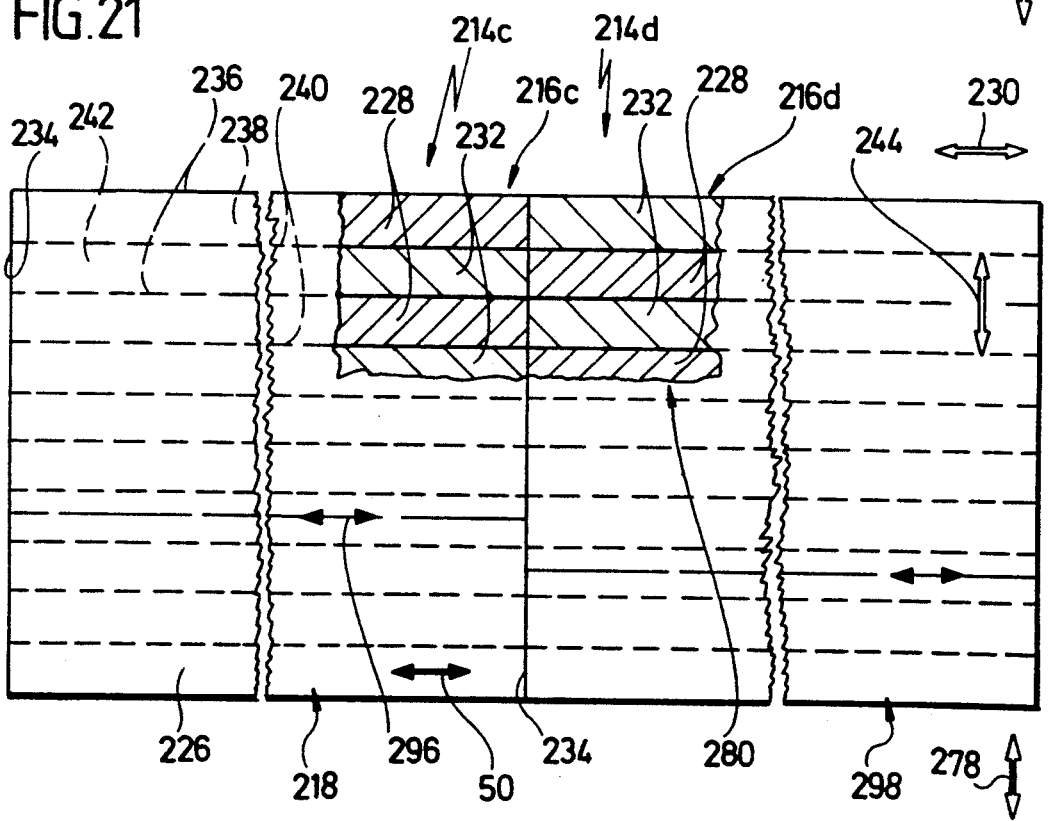

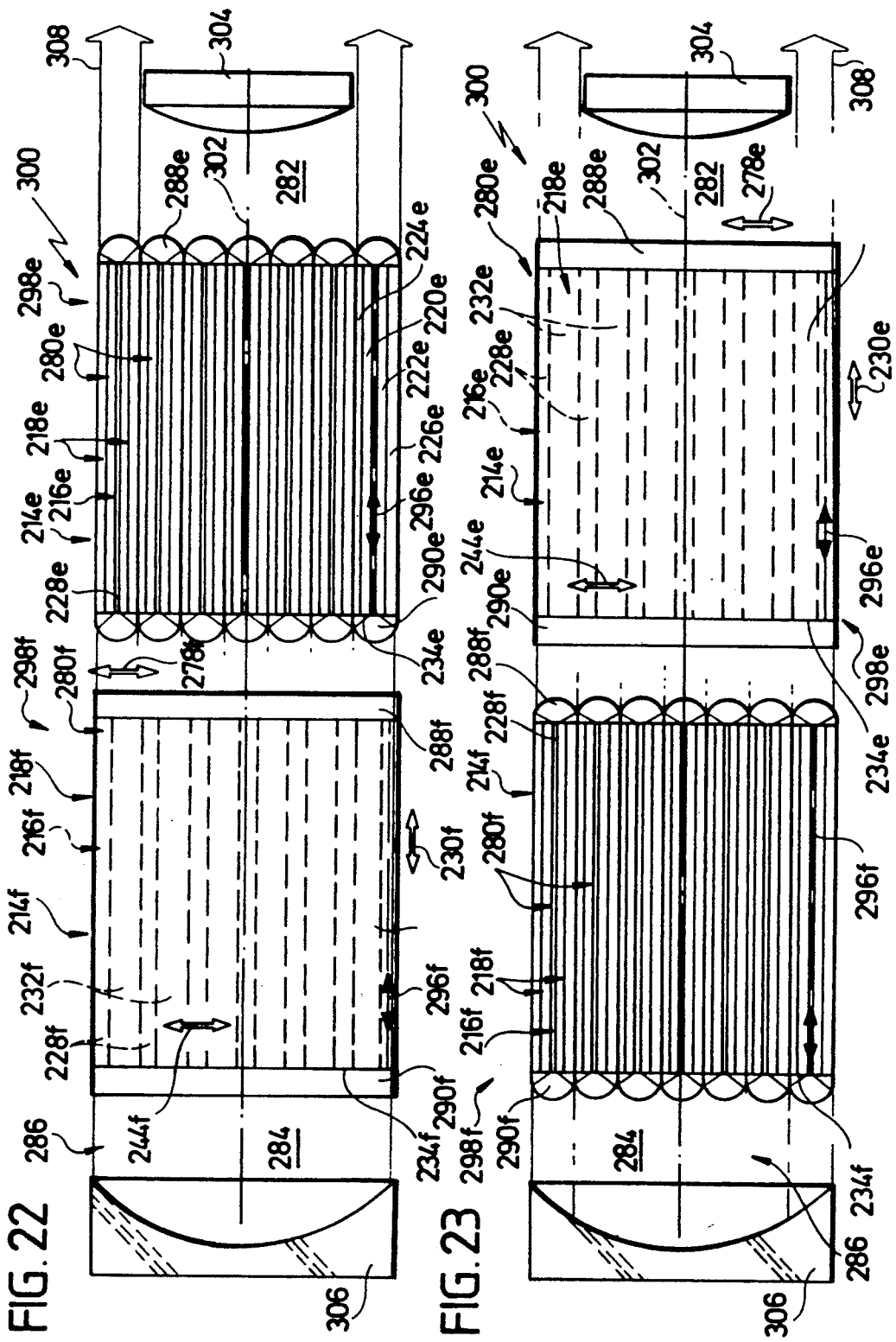

SOLID-STATE LASER

The invention relates to a solid-state laser comprising a resonator, at least one laser amplification volume arranged in the resonator and a pump means for exciting the laser amplification volume.

In all hitherto known solid-state lasers such as optically pumped solid-state rod lasers or semiconductor lasers, problems arise with the controlling of the dissipation heat.

when unfiltered light from gas-discharge lamps is used as pumping power source, one has to assume that, for example, in the case of the Nd laser approximately three times the obtainable laser power will remain as heat in the solid-state rod. This heat causes temperature gradients which in individual cases result in breakage of the crystals, but at any rate in optical deformations. For these reasons, today's solid-state lasers are subject to a power limit which does not permit multi-kilowatt operation if the beam quality is still to be good and adaptable to changing operating conditions.

A further problem of the known optically excited solid-state lasers resides in the design of the excitation light source. With a total laser efficiency of a few percent, the excitation lamps have to convert up to 100 kW if the laser is to generate a few kW laser power. This power concentration can only take place in larger volumes and surfaces. On the other hand, the emitted light has to be directed at the active medium. The latter should absorb the excitation light as completely as possible, which requires a layer thickness of several mm.

The same problems occur with the semiconductor laser where, in addition, a laser-active semiconductor layer region cannot be of optional, large-volume configuration if purposeful laser amplification is to be achieved.

In view of these disadvantages of the prior art, the object underlying the invention is to so improve a solid-state laser of the generic kind that it is suitable for generating high power.

This object is accomplished in accordance with the invention in a solid-state laser comprising a laser-active unit with a laser amplification volume extending in a first direction in a solid, a pump means associated with the laser amplification volume for exciting it and a resonator with an excitation section which is arranged between its resonator mirrors and in which a beam extends in a direction of propagation and thereby penetrates in the laser amplification volume in the first direction, by at least two excitation sections being provided, each having one laser amplification volume, by the beams of the excitation sections extending in spaced relation to one another, by the resonator having a coupling section containing a coherent joint beam of the resonator, the cross-section thereof being comprised of several partial beams, and by an optical element being arranged between the coupling section and each excitation section for imaging one of the partial beams of the joint beam into one of the beams extending in spaced relation to one another in the excitation sections.

The advantage of the inventive solution is that with this solution it is made possible for the beams of the individual excitation sections to be imaged into partial beams which, for their part, add up in cross-section and thereby produce a joint beam in which there is coherent radiation over all of the partial beams. In this way, the amplification of at least two laser amplification volumes can be used to generate a joint beam which as such is coherent and has high laser power.

With the invention solution, it is not absolutely necessary for all of the partial beams of the joint beam to be imaged into a beam of one of the excitation sections. It is also adequate for only individual ones of the partial beams of the joint beam to be imaged into a beam of one of the excitation sections while the other partial beams of the joint beam do not experience such imaging. In any case, it is, however, necessary for all of the partial beams to be coherent among one another in the joint beam.

In accordance with the invention, it is particularly advantageous for the partial beams to form a joint beam which is coherent in the cross-sectional direction.

The optical element can be designed in a variety of different ways and, in particular, the design of the optical element will depend on the shape of the partial beam and of the beam. It is particularly advantageous for the optical element to image the respective partial beam into the beam such that the latter is narrowed in a cross-sectional direction with respect to the partial beam. This enables the laser amplification volume to also be made narrower in conformance with the dimensions of the beam in this direction.

In the above description of the inventive solution, the dimensions of the laser-active unit were not specified. However, particularly advantageous designs of the inventive solid-state layer are obtainable by the laser-active unit having in the cross-sectional direction a width which corresponds at the most to a width of the partial beam imaged by the optical element onto the beam in this direction. In this way it is made possible for a partial beam to be imaged into an excitation section without disturbing the course of the partial beam lying alongside it.

This is, for example, made possible by a partial beam being imaged into the beam of an excitation section and the partial beam lying alongside it being allowed to run on alongside the excitation section. An embodiment of the inventive solution has proven particularly advantageous wherein the optical elements of excitation sections lying alongside one another adjoin one another and image partial beams immediately adjacent one another essentially continuously into the beams lying alongside one another and in spaced relation to one another.

In such embodiments wherein the beam is narrowed in the one cross-sectional direction with respect to the partial beam, provision is preferably made for the laser-active unit to comprise in this cross-section direction supply elements arranged alongside the laser amplification volume for the latter.

One embodiment of the inventive solution is designed such that the joint beam is imaged by the optical elements continuously into the beams of the excitation sections.

So far no details of the design of the optical elements have been given. The optical elements are preferably designed so as to comprise a cylindrical optical means, particularly when the optical elements image the partial beam into a beam which is narrowed in a cross-sectional direction.

The optical elements can be designed as reflectors or as lenses. The optical elements are preferably cylindrical lenses.

Furthermore, it is advantageous for each optical element to image parallel rays of the joint beam into quasi-parallel rays of the beam so that, in particular, a joint beam with a substantially parallel path of rays is imaged into a beams with a likewise substantially parallel path of rays.

Since the inventive concept is based on the excitation sections being arranged in spaced relation to one another, this preferably also incorporates the laser amplification volumes being spaced in relation to one another.

In a particularly advantageous geometrical configuration, provision is made for the laser amplification volumes to be arranged at regular spacings from one another.

The solution is preferably designed such that the beams penetrating different laser amplification volumes extend parallel to one another. In this way, in particular, a very compact design of the inventive solid-state laser is achieved.

Since one must work with as high pumping powers as possible in the laser amplification volume in high-power lasers, cooling of the laser amplification volume is expedient, and this cooling is made as effective as possible. For this reason, it is advantageous for each laser amplification volume to be cooled on at least one side extending parallel to the beam. Herein it is even better for each laser amplification volume to be cooled on opposite sides.

In this case, the supply elements mentioned at the beginning preferably carry out the cooling of the laser amplification volume.

In particular, with laser amplification volumes arranged alongside one another, provision is advantageously made for that side on which cooling of the laser amplification volume takes place to be the side facing the adjacent laser amplification volume. This is advantageous particularly when this side of the laser amplification volume has a larger surface than the side facing away from the adjacent laser amplification volume as a more effective and, in particular, also more uniform cooling is possible with this solution.

Furthermore, in the description of the embodiments so far no details were given as to the side from which excitation of the laser amplification volume is to take place. It is particularly advantageous for each laser amplification volume to be excitable from at least one excitation side extending parallel to the beam.

Even more optimum excitation is obtained when each laser amplification volume is excitable from two opposite excitation sides.

The excitation side can be selected so as to be that side facing away from the adjacent laser amplification volume but, in particular, in a semiconductor laser it is advantageous for the excitation side to be the side facing the adjacent laser amplification volume.

In all of the embodiments described hereinafter, provision is made for at least one laser-active region penetrated by the respective beam to be provided in each laser amplification volume.

Furthermore, the object mentioned hereinabove is accomplished in accordance with the invention is a solid-state laser of the kind described at the beginning by the resonator being a coupled resonator, by the resonator having two elongated excitation sections—in particular lying in one plane—with one of the laser amplification volumes being arranged in their respective beam, by the resonator having a coupling section which the beam of the excitation sections enter as outer beams extending in spaced relation to one another —in particular parallel to one another—and which couples the excitation sections with one another by displacing the outer beams in the plane defined by these to a coupling axis lying—in particular parallel to the outer beams—between these beyond this coupling axis, and by the laser amplification volumes being cooled on side surface extending along the beam and being excitable by the pump means from a side surface extending along the beam.

Hence the inventive solution enables at least two laser amplification volumes to be advantageously coupled with one another, with the dissipation heat being controlled better in these two layer amplification volumes and the excitation for high powers being possible in a simple way. This is, for example, achieved by the laser amplification volumes being cooled on at least one side and being irradiated by the high-power source on a side which is not cooled. On those sides which are cooled, this cooling can thus be made as effective as possible, which enables better removal of the dissipation heat than in the solutions heretofore. Furthermore, this also allows the laser amplification volume to be excited with higher pumping powers. Finally, use of at least two laser amplifications volumes makes it possible to use a compact design, in particular, a compact structural length, and yet to couple-in the pumping power over a large surface and remove the dissipation heat.

No details were given in the description of the embodiments hereinabove as to the design of the coupling section. Particularly good coupling is achieved in the coupling section by the coupling section comprising the beam path of an unstable resonator.

Furthermore, a particularly advantageous, compact geometrical arrangement with best possible imaging characteristics is achieved with the outer beams lying symmetrically in relation to the coupling axis.

Regarding the design of the mirrors of the coupling section, it is particularly expedient for the coupling section to comprise one mirror which reflects towards the coupling axis and one mirror which reflects away from the coupling axis, with these complementing each other in such a way that the outer beams are displaced parallel in the direction towards the coupling axis and imaged towards the latter by the two mirrors.

In the simplest case, provision is made for the mirror reflecting towards the coupling axis to protrude with its active region in the radial direction away from the coupling axis beyond the active region of the mirror reflecting away from the coupling axis and to be acted upon by the outer beams in this protruding region.

In geometrically advantageous solutions, provision is made for the coupling section to comprise one convex and one concave resonator mirror.

With a view to achieving geometrical relations which are as simple as possible, it is preferable for the resonator mirrors to be designed and arranged confocally in the coupling section.

In the explanation of the embodiments hereinabove, no details were given about the mirrors with which excitation sections are equipped. In a preferred embodiment, provision is made for the excitation sections to be closed off by end mirrors on each side facing away from the coupling section.

These end mirrors preferably reflect the beams in the excitation sections into the coupling section and if a mirror which reflects towards the coupling axis is used in the coupling section, these beams strike this mirror, while the mirror reflecting away from the coupling axis extends between the beams coming from the excitation sections and preferably as far as these.

In the description of the embodiments so far, no details were given as to how the laser radiation is to be coupled out of the resonator. One advantageous possibility is for one of the end mirrors to be semitransmissive. As an alternative to this, it is, however, also conceivable for both end mirrors to be semitransmissive.

In principle, the end mirrors can be of flat mirror design. However, since the beams of the excitation sections extend over a considerable length and even diffraction effects cause a beam with a parallel beam path to later expand in the coupling section, provision is preferably made for the end mirrors to have a curvature which compensates expansion of the beam in the excitation section and reflects the radiation coming from the coupling section back into it. Hence expansion of the beams in the excitation sections can also be compensated with the end mirror and the resonator thereby made more efficient.

In the event there are two excitation sections, the structurally simplest solution is to use separate end mirrors. If, however, the end mirrors are to be held in a stable manner, it is advantageous particularly if a plurality of excitation sections is used, for the end mirrors which close off the excitation sections to be united to a mirror ring.

If, as described hereinabove, the end mirror should expediently also have a curvature in order to compensate expansion of the beams in the excitation sections, provision is preferably made for the mirror to be of toroidal shape.

Particularly advantageous guidance of the beams in the coupling sections which is geometrically desirable as far as the imaging characteristics are concerned is achieved by the coupling axis being the axis of symmetry of the resonator mirrors of the coupling section.

In the even that only two excitation sections are used, provision is expediently made, for reasons of simplicity, and, in particular, in view of the advantageous beam shape of the emerging laser beam, for the resonator mirrors of the coupling section to have cylindrical mirror surfaces, and, in particular, in this case, the resonator is a cylinder resonator with confocally arranged mirrors.

Within the scope of the inventive solution, it is advantageous, in particular, to increase the power yet remove the dissipation heat expediently, to provide several outer beams which are arranged in different planes extending through the coupling axis and continuous in corresponding excitation sections.

The planes are preferably arranged at constant angular spacings from one another so the outer beams are at constant spacings from one another running in the azimuthal direction around the coupling axis.

In this case, the resonator mirrors of the coupling section are preferably of such shape that they have spherical mirror surfaces and extend symmetrically with respect to rotation around the coupling axis.

In arrangement which is advantageous particularly from a geometrical point of view, the outer beams form annular segments relative to the coupling axis.

Insofar as the outer beams which continue in the beams of the excitation sections are spaced from one another in the azimuthal direction around the coupling axis, it is particularly advantageous, in order to achieve optimum coupling of all outer beams with one another in the coupling section, for the coupling section to be closed off in the annular segments which receive no outer beams coming from the excitation sections by mirrors which reflect back. The mirrors which reflect back serve to close off the coupling section completely in the azimuthal direction so that formation of a beam path radially symmetrically in relation to the coupling axis in all directions is possible and all directions are thereby coupled with one another via the coupling axis.

In the simplest case, provision is made for the mirrors which reflect back to be essentially flat mirrors and to thus reflect back the incident rays in the same way as the end mirrors of the excitation sections.

The mirrors which reflect back are preferably positioned such that in the direction of propagation of the radiation on the coupling section side they are arranged before the solid-state rods to thereby enable the spaces between the solid-state rods to be used for cooling these.

A solution wherein the mirrors which reflect back are arranged directly at the level of one of the mirrors of the coupling section, preferably the mirror that reflects away from the coupling axis, is particularly advantageous.

In a particularly preferred embodiment, in particular to improve the coupling of the outer beams and to achieve an optimum, compact structural design, provision is made for the sum of all of the outer beams to form essentially a closed annulus in the coupling section so the mirrors which reflect back can be dispensed with.

Particularly when more than two excitation sections are provided, it has proven expedient for the excitation sections to be arranged axially symmetrically around an axis.

Furthermore, in order to simplify the structural design, in particular, a compact structural design, the excitation sections are aligned so as to extend parallel to one another.

To establish correct imaging relations between the coupling section and the excitation sections, there is preferably provided between the coupling section and the excitation sections an optical element for imaging the outer beams onto the beams in the excitation sections.

The optical element expediently comprises a cylindrical optical mean which, in particular, is of such design that a cylindrical axis of the cylindrical optical means extends in the radial direction.

Such a cylindrical optical means enables optimum exploitation of the coupling section in the azimuthal direction and, on the other hand, azimuthal spacings which are as large as possible between the laser amplification volumes, namely when the cylindrical optical means comprises a cylindrical, optical, annular segment which respectively images the outer beam forming an annular segment in the coupling section onto a beam which is narrower in the azimuthal direction in relation to the coupling axis in the excitation section.

The width of the beam in the azimuthal direction in the excitation section preferably corresponds at the most to the width of the laser amplification volume in this direction.

A particularly preferred solution within the meaning of the invention is obtained when the cylindrical, optical, annular segments unite to form an annulus and when this annulus comprised of cylindrical, optical, annular segments is capable of imaging an annulus closed by the outer beams in the coupling section onto a plurality of beams spaced from one another in the azimuthal direction in the excitation section so that, on the one hand, there is a cylindrical-symmetrical beam path in relation to the coupling axis in the coupling section and, on the other hand, the spacings of the beams in the azimuthal direction in the excitation sections enable the laser amplification volumes to be cooled in the region of these spaces.

In the description of an embodiment of the inventive solution hereinabove, no details were given as to how the laser amplification volumes are to be arranged and designed.

In a preferred embodiment, provision is made for he laser amplification volumes to be aligned parallel to one another.

In particular, for geometrical-optical reasons, provision is expediently made for the laser amplification volumes to be identical in shape. In principle, the geometry of the laser amplification volumes can be selected optionally. A round or oval cross-section is, for example, conceivable. It is, however, particular advantageous for the laser amplification volumes to be designed as elongate laminae.

To achieve amplification which is as uniform as possible, it is, furthermore, advantageous for the laser amplification volumes to be made of identical material.

A geometry of the laser amplification volumes has, however, proven particularly advantageous wherein the laser amplification volumes have two broad sides facing each other, with the spacing of the broad sides preferably being selected such that optimum heat removal of the dissipation heat from the laser amplification volumes can take place in the direction of the broad sides.

It is furthermore, advantageous for the laser amplification volumes to have two narrow sides facing each other, with the spacing of the narrow sides being selected such that it is essentially of the order of magnitude of a penetration depth of the pumping power so coupling-in of the pumping power preferably takes place via the narrow sides.

The type of the laser amplification volume was not specified in any of the inventive solutions described hereinabove. In an advantageous embodiment the layer amplification volume is formed by a solid-state rod.

This solid-state rod is preferably optically excitable and, in particular, the pumping means irradiates the solid-state rod from one side.

An embodiment wherein the pumping power impinges upon a narrow side is particularly simple.

In this case, it is then likewise advantageous for at least one broad side to be cooled.

The broad sides are preferably flat surfaces. It is similarly expedient for the narrow sides, in particular the narrow side on which the pumping power impinges, to also be designed as flat surfaces.

In the simples case, it is advantageous for the solid-state rods to have an essentially four-cornered cross-section, with the two broad sides extending essentially perpendicular to the two narrow sides.

Particularly advantageous cooling of the solid-state rod is possible when the solid-state rod is cooled on both broad sides. Optimum cooling of the solid-state rod is possible when the solid-state rod is additionally cooled on a narrow side and coupling-in of the pumping power, therefore, takes place on one narrow side only.

The description of the embodiments hereinabove contains no details of the type of cooling. It has proven particularly advantageous for the solid-state rods to be cooled by contact with a flow-free material, i.e., for cooling to take place by direct thermal contact with an elastic or plastic substance or a rigid body, it also being possible, in the even a rigid body is used as cooling element, for an elastic or plastic substance to serve as heat-transmitting medium between the cooling element and the solid-state rod.

In general, if such contact cooling is used, it is advantageous for the solid-state rods to be cooled on their sides facing one another so the solid-state rods can, for example, be acted upon the pumping power on their sides facing away from one another.

In particular if the excitation sections are arranged axially symmetrically in relation to an axis, provision is expediently made from the solid-state rods to be cooled on a side extending approximately in the direction towards a radius direction of the axis.

In accordance with the invention, the most advantageous cooling is enabled by the solid-state rods being cooled by contact with a cooling element, with the cooling element preferably resting on two sides of the solid-state rod facing each other.

In this case, to avoid a heat-transmitting medium in the form of an elastic or plastic material, provision is preferably made for the cooling element to rest with a press fit on the solid-state rod, with the press fit preferably being established by the contact with the two sides of the solid-state rod facing each other.

In principle, it is possible to allocate to each solid-state rod a cooling element of its own. It is, however, particularly advantageous for the cooling element to lie between the solid-state rods of the excitation sections which belong to one another.

Furthermore, the cooling element also makes it possible for it to be designed so as to carry the solid-state rods so that fixing of the solid-state rods by additional holding means is not necessary but at the same time cooling of the solid-state rod also takes place via these holding means.

In a particularly preferred solution, provision is made for the solid-state rod to sit with both broad sides and one narrow side in a groove of the cooling element.

Details have also not been given about the material from which the cooling element should be made. It is advantageous for the cooling element to be made of a material with good heat conductivity, and it is preferable for the cooling element to be a metal element.

To keep the cooling element at a constant temperature, it is expedient for a cooling medium to flow through the cooling element.

In the description of the embodiments hereinabove, it was not explained in detail how the solid-state rods are acted upon by the pumping power. In a particularly preferred solution, provision is made for the solid-state rods to be acted upon with pumping power on their sides facing away from one another. Such a solution provides the optimum geometrical possibilities for introducing as much pumping power as possible into the solid-state rods. In all of the embodiments in which the excitation sections are arranged axially symmetrically around an axis, this is achieved by the solid-state rods being irradiated by the pumping power source on a side surface extending essentially transversely to a radius direction of the axis. This makes it possible for the solid-state rods to be acted upon with pumping power in the radial direction in relation to the axis away from this axis or in the radial direction in relation to the axis towards this axis. It has proven particularly advantageous for the solid-state rods to be acted upon with the pumping power in the radial direction of the axis toward the latter.

Moreover, in all the embodiments in which the solid-state rods are cooled by the cooling element, the solid-state rods can be advantageously acted upon with the pumping power by each solid-state rod being acted upon by the pumping power on its side surface which is not encompassed by the cooling element.

In combination with the arrangement of the cooling element, the most advantageous geometrical arrangement of cooling element and pumping power source is for the cooling element to be surrounded by the pumping power source. In this case, the pumping power source is expendiently designed so as to radiate in an essentially radial direction onto the cooling element.

To enable the pumping power to be coupled into the solid-state rods as effectively as possible, it is expedient for elements which concentrate on the solid-state rods to be provided for the pumping power.

These concentrating elements are preferably designed to deflect onto the solid-state rods electromagnetic radiation emitted by the pumping power source into a solid angle.

One possibility of providing such concentrating elements is to provide an optical refraction means, for example, in the form of a cylindrical lens between the pumping power sources and the solid-state rods.

It is, however, even more advantageous for the concentrating elements to be reflectors which can be arranged on a side of the pumping power source facing the respective solid-state rod or between the pumping power source and the respective solid-state rod.

In a particular good combination of the concentrating elements with the cooling element, provision is made for the intermediate webs of the cooling elements to pass on the pumping power impinging thereon to the solid-state rods, it being possible for this passing-on to be implemented in a variety of different ways.

Here, it has, however, proven particularly advantageous for the intermediate webs to comprise surfaces which reflect the pumping power to the solid-state rods.

In the simplest case, the intermediate webs are designed so as to rise in tapering configuration above the solid-state rods, the simplest solution from a manufacturing viewpoint being that of the intermediate webs tapering in wedge-shaped configuration.

Within the scope of the present invention, a very wide variety of solutions is likewise conceivable for the type of design of the pumping power source.

In a particularly preferred embodiment, provision is made for the pumping power source to surround the solid-state rods in annular configuration.

In this case, the pumping power source is preferably a gas-discharge lamp.

Such a gas-discharge lamp can be operated in many different ways. In a preferred embodiment, provision is made for a gas discharge to be generated in the gas-discharge lamp by a field extending essentially radially in relation to its axis.

It is however, also conceivable for a gas discharge to be generated in the gas-discharge lamp by a field extending azimuthally in relation to its axis, the gas-discharge lamp being divided by electrodes into annular segments for this purpose.

It is particularly advantageous for the gas discharge to be generated by high frequency in the gas-discharge lamp, with the high frequency then being applied by electrodes spaced in the radial or azimuthal direction.

As an alternative to this, it is, however, also conceivable, instead of using electrodes, for the high frequency to be coupled into the gas-discharge lamp in the form of microwaves.

A further alternative to the coupling of the high frequency into the gas-discharge lamp is inductive coupling of the high frequency into the gas-discharge lamp.

As an alternative to provision of a single pumping power source, it is, however, likewise conceivable to arrange a plurality of single pumping power sources around the cooling element, the single pumping power sources being arranged, in particular, alongside one another. In the simplest case, the single pumping power sources are likewise gas-discharge lamps with the gas discharge preferably being generated by high frequency with one of the types of coupling-in mentioned hereinabove.

As an alternative to this it is, however, also conceivable for the single pumping power sources to be designed as rows of laser diodes which have the advantage of an emission characteristic concentrated on a small solid angle.

As an alternative to the variant of the solid-state laser described hereinabove with an optically pumped solid-state rod, provision is likewise preferably made in the inventive solution for the laser amplification volume to be that of a semiconductor layer and, in this case, the laser-active unit is formed by a semiconductor laser means of commonly known design. In such a semiconductor laser, provision is made for several laser-active regions to be provided in each layer amplification volume. Herein the laser-active regions are the laser-amplifying semiconductor layer regions of a semiconductor laser.

In the inventive use of a semiconductor laser as laser-active units, provision is preferably made for the laser-active regions to be seated between semiconductor layers of the pumping means forming a pn-junction.

These laser-active regions are preferably of strip-shaped design and, in particular, arranged in spaced relation to one another to make is possible for these laser-active regions to be supplied with sufficient cooling power.

In an expedient arrangement, provision is made for the laser-active regions to extend parallel to one another.

In this case, laser-inactive regions are preferably arranged in spaces between the layer-active regions so that laser-active and laser-inactive regions alternate with one another in a layer.

In one variant which allows the beam to run in a disturbance-free manner in such a laser excitation volume, provision is preferably made for the laser-inactive regions to be of transparent design for the beam, in particular, to be made of transparent material.

Herein the laser-inactive regions are preferably in the form of semiconductor layer regions but with an increased ban gap with respect to the laser-active regions so that there is no absorption of the laser radiation in the laser-inactive regions.

Since in such an embodiment of the inventive solution the beam penetrates partly laser-active and partly laser-inactive regions, problems arise when the laser-inactive regions and the laser-active regions do not have the same index of refraction. In this case, the arrangement of the laser-active and laser-inactive regions represents a phase grid for the beam. Hence in the event the laser-active and laser-inactive regions do not have the same index of refraction, it is advantageous for the optical length of the laser-active and laser-inactive regions to be of such dimensions that the parts of the beam penetrating these have the same phase position so that the maximum intensity lies in the zeroth order of the phase grid.

As an alternative to the solution in which the laser-inactive regions are made of transparent material, provision is made in a further inventive solution for the laser-inactive regions to be material-free channels so that no problems can arise with the absorption in these laser-inactive regions.

However, in this case the indexes of refraction differ between the laser-active and laser-inactive regions so that the optical length of the laser-active and laser-inactive regions is advantageously of such dimensions that the parts of the beam penetrating these differ in phase by an integral multiple of $2\pi$.

In a particularly preferred embodiment of the inventive solution, it is additionally advantageous for the same partial beam, imaged as beams, to penetrate two laser amplification volumes of two laser-active units which are arranged one after the other in the direction of propagation of the beams so that a further power increase is thereby possible.

Herein the laser-active units are advantageously arranged either immediately one behind the other or in the form of two excitation sections which are arranged one behind the other and between which imaging into a partial beam again takes place.

In the cases where the laser-active units are arranged immediately one behind the other, it is possible for the laser-active and laser-inactive regions to be in alignment with one another. It is, however, also possible for the laser-active regions to be arranged in offset relation to one another so that, for example, a laser-inactive region of a laser-active unit is in alignment with the laser-active region of the other laser-active unit or the laser-active regions are offset in relation to one another in the transverse direction.

In particular, such arrangements are also advantageous with excitation sections which are arranged in succession. Herein a further advantageous variant is made possible by the laser-active units being turned with respect to one another, preferably through an angle of 90°, about an axis parallel to the direction of propagation.

Furthermore, an advantageous embodiment makes provision for several laser-active units to be arranged alongside one another in sandwich-like configuration. It is particularly advantageous for several laser-active units to form a laser-active block.

The pumping means is preferably connected to a cooling element so that the laser-active regions are preferably pumped and cooled from sides facing one another.

The cooling element is expediently designed so as to comprise at least one heat-conducting layer.

The pumping means and the cooling element are preferably integrated into the laser-active unit and arranged as such in an excitation section.

Figure 4:
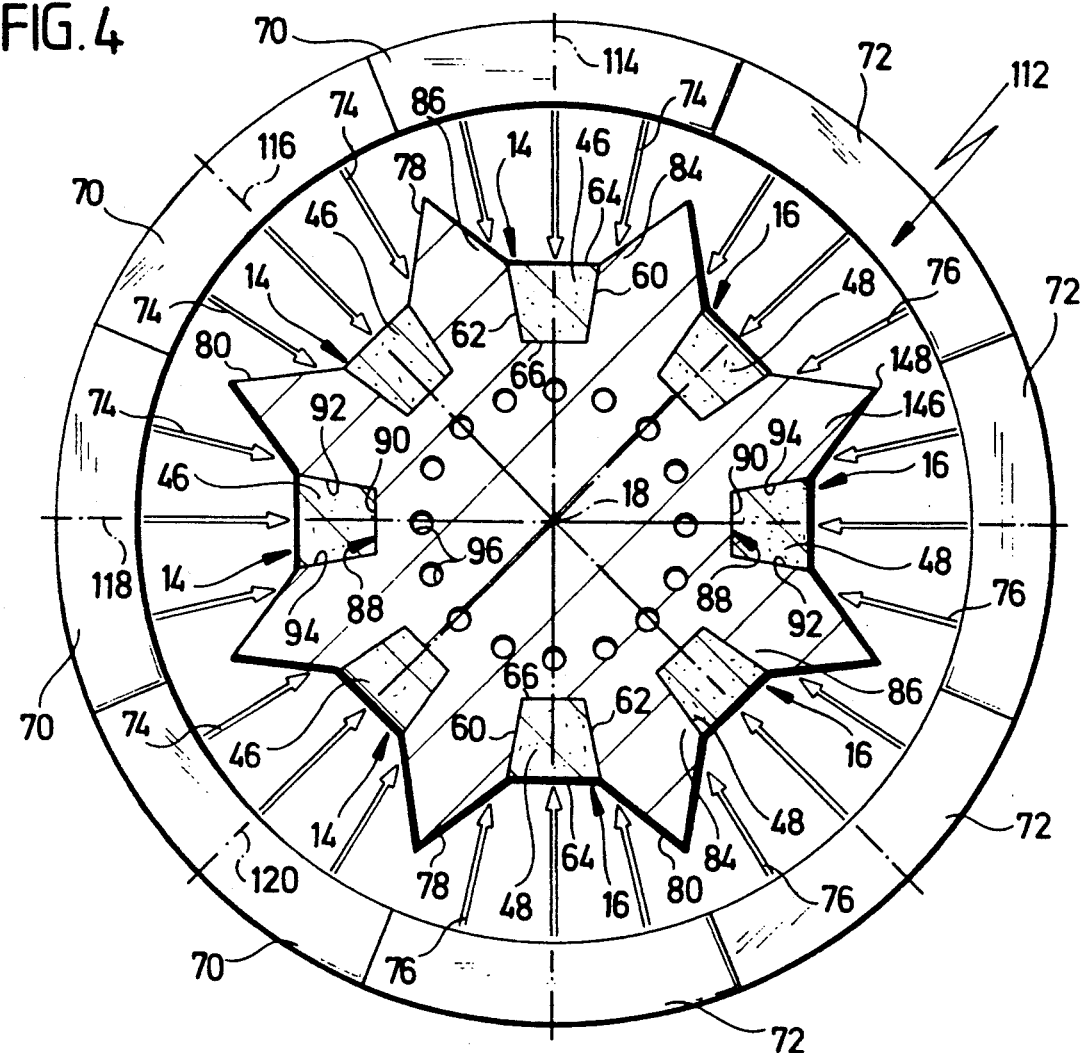
Figure 5:
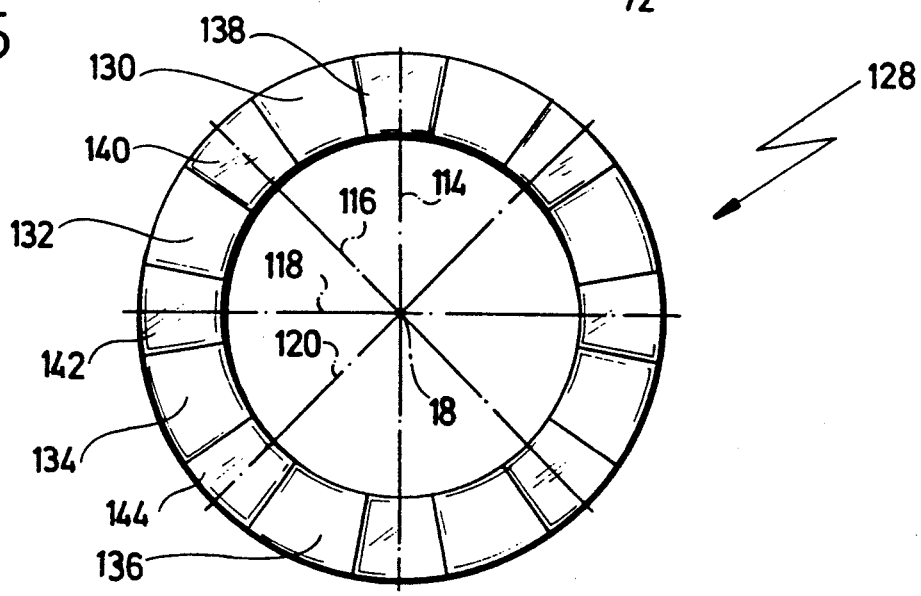
Figure 9:
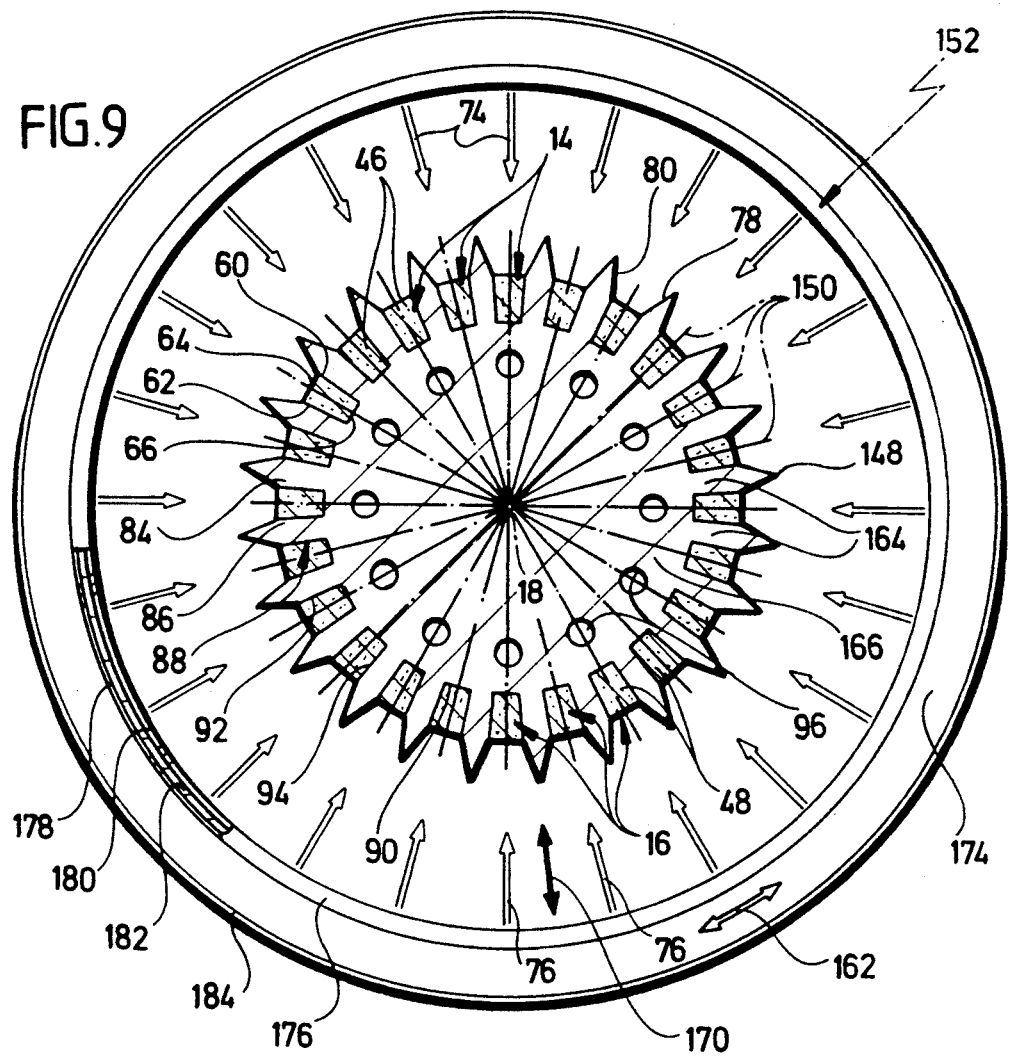
Figure 10:
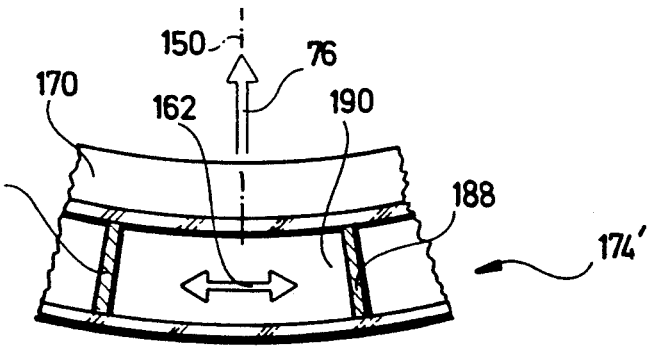
Figure 11:
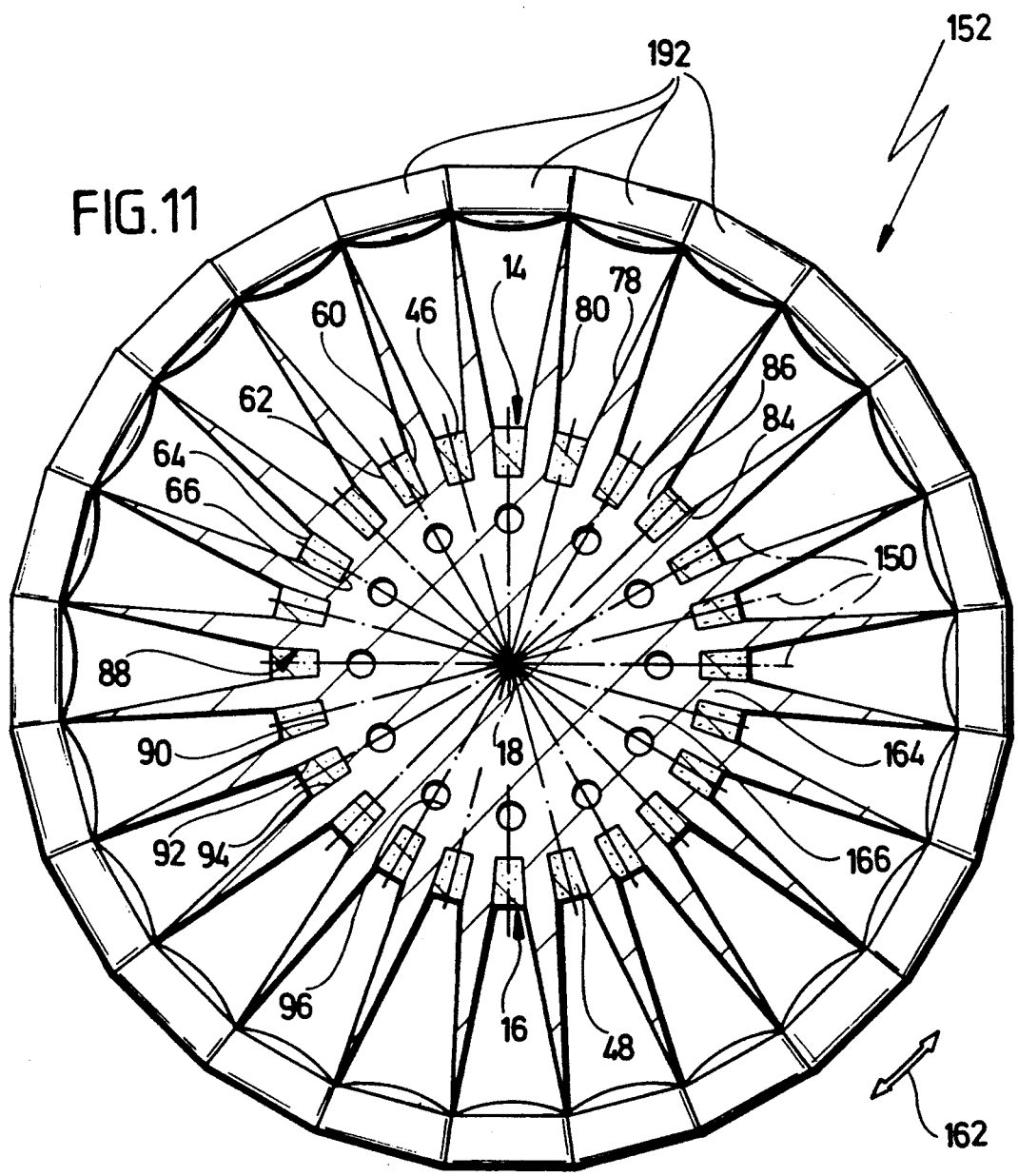
Figure 12:
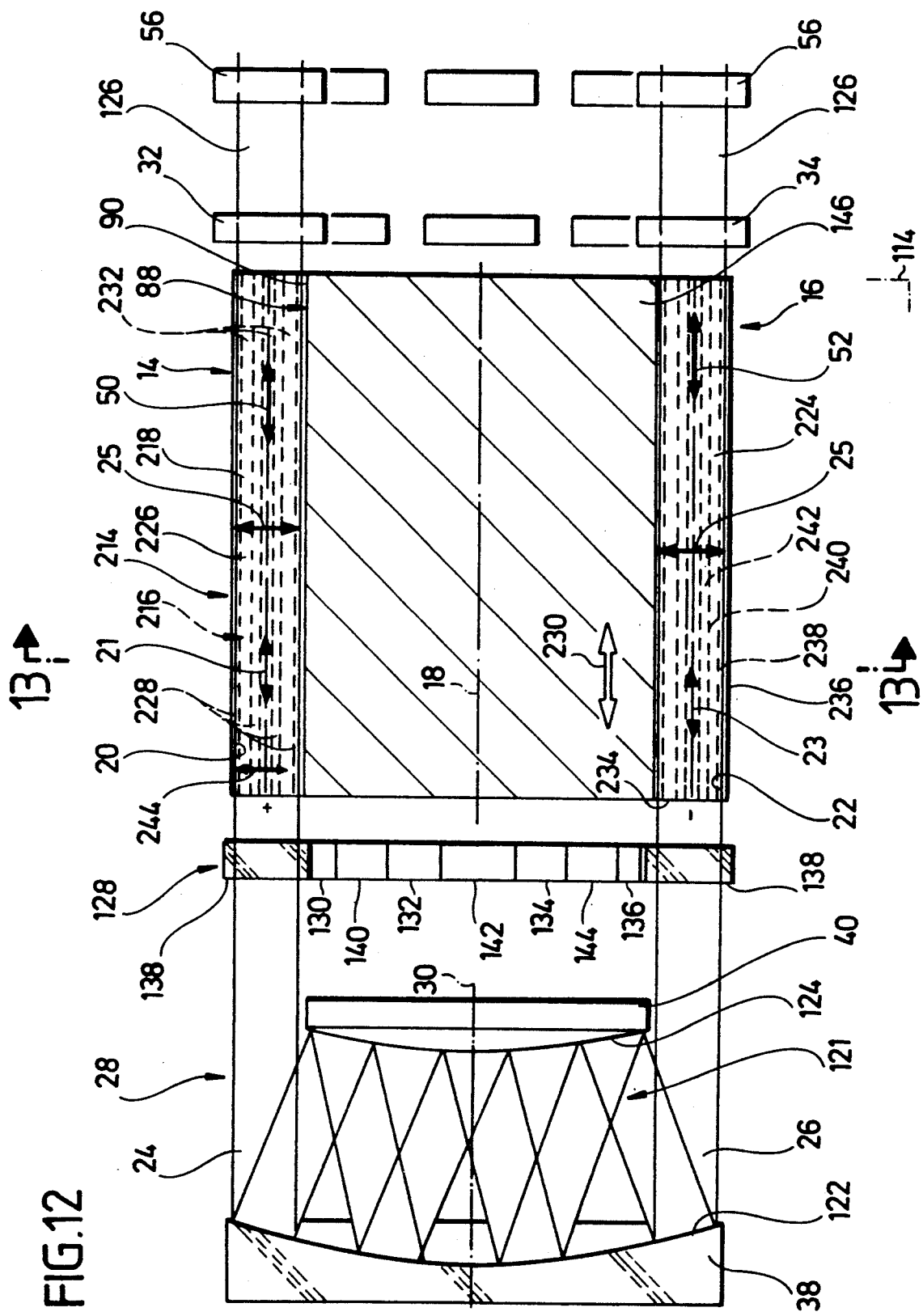
Figure 13:
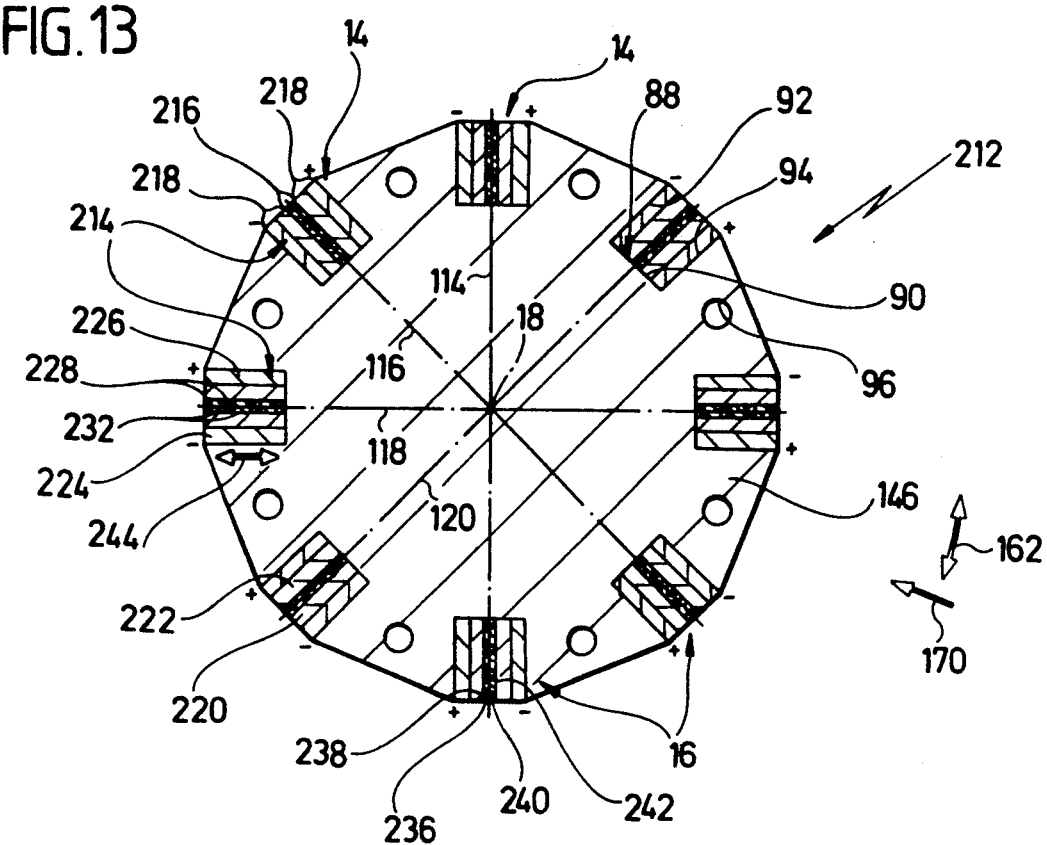
Figure 14:
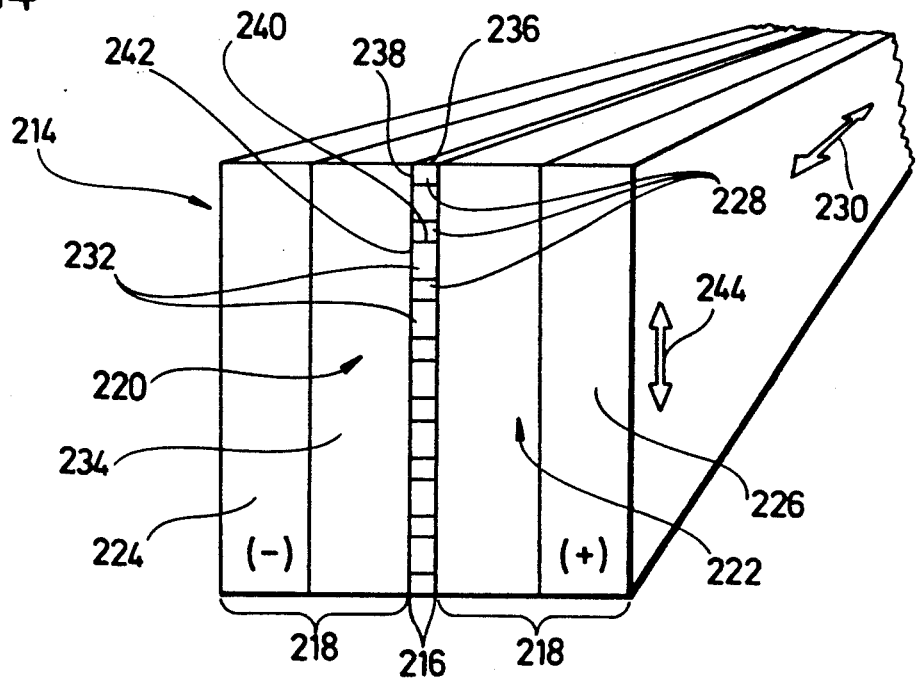
Figure 15:
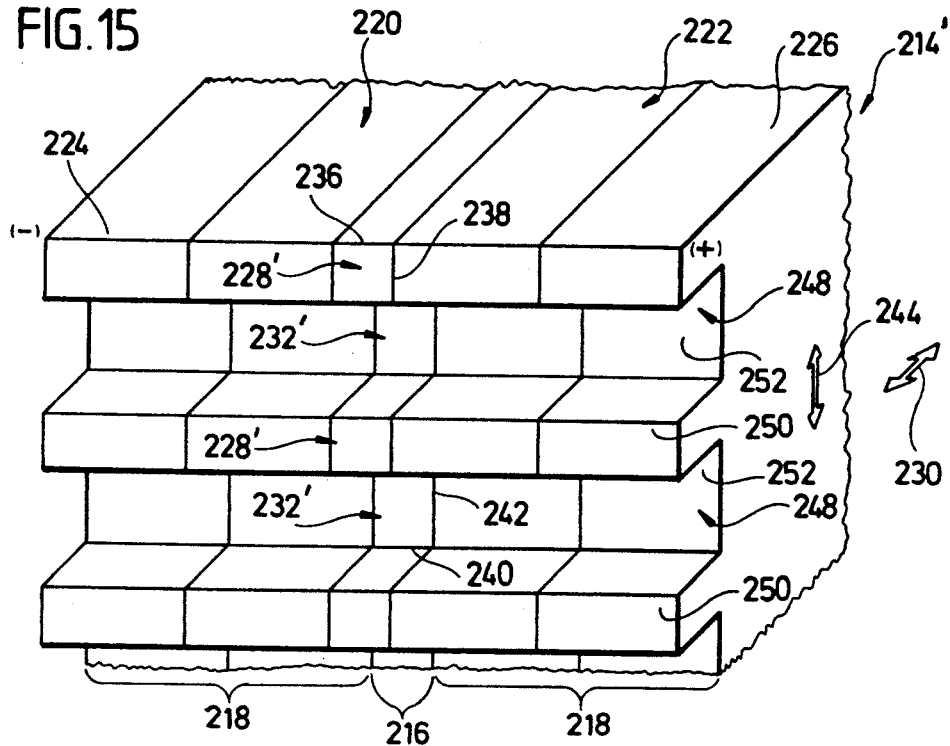
Figure 16:
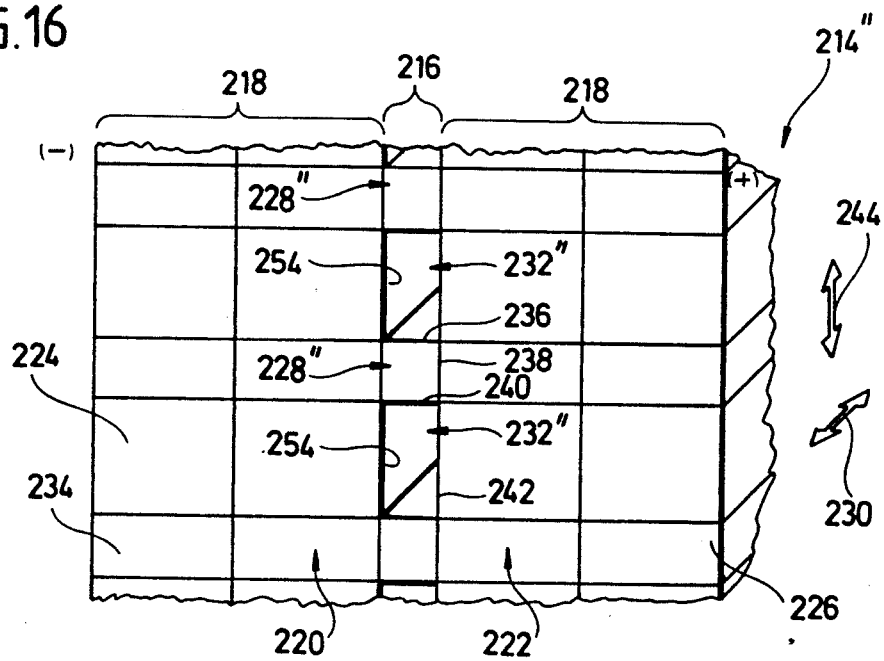
Figure 17:
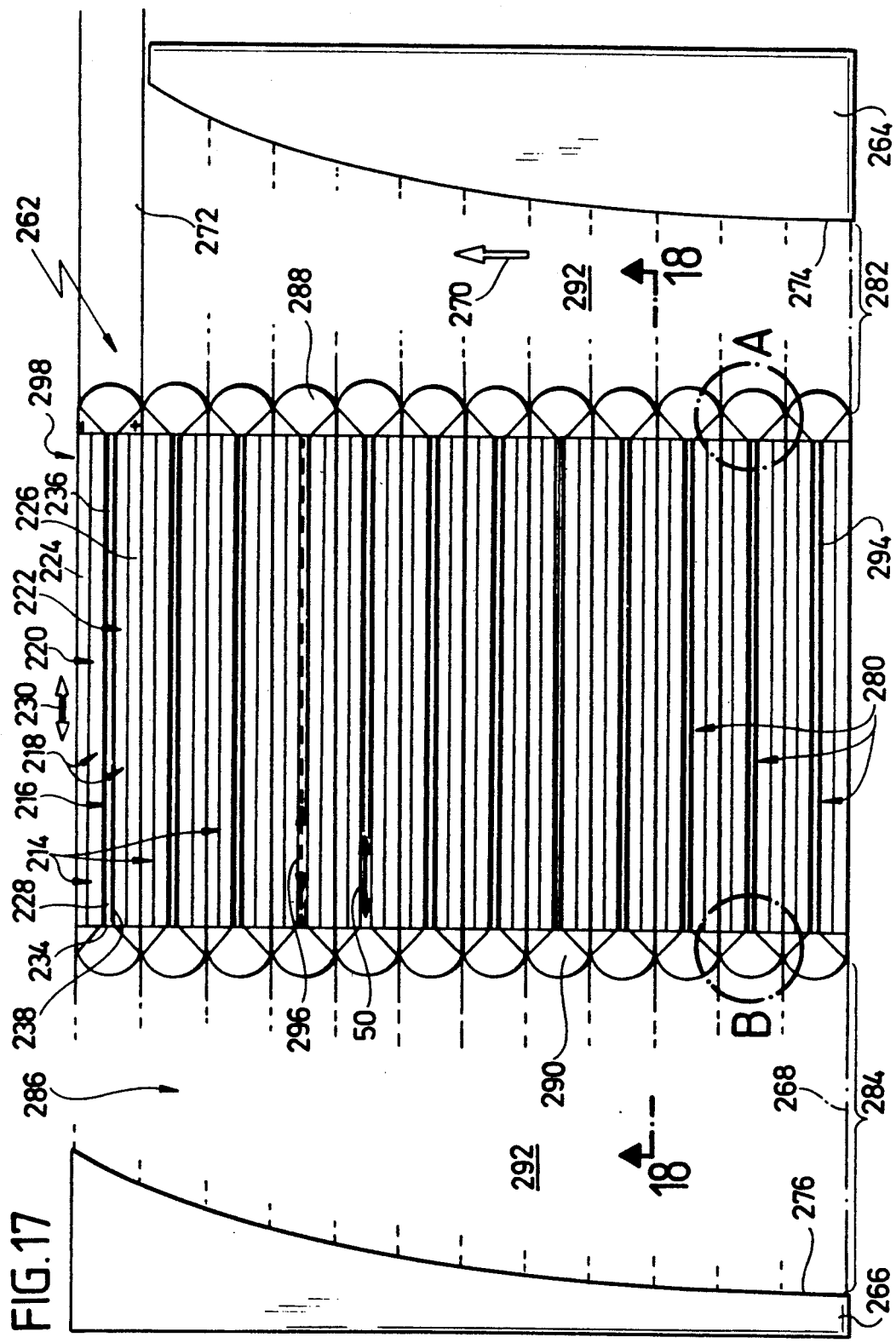

Further features and advantages of the invention are the subject matter of the following description and the appended drawings of several embodiments. The drawings show:

FIG. 1 a plan view of a first embodiment;

FIG. 2 a section along line 2—2 in FIG. 1;

FIG. 3 a section through a second embodiment;

FIG. 4 a section along line 4—4 in FIG. 3;

FIG. 5 a section along line 5—5 in FIG. 3;

FIG. 6 a section through a third embodiment;

FIG. 7 a partial section along line 7—7 in FIG. 6;

FIG. 8 an angled, planar illustration of the partial section in FIG. 7;

FIG. 9 a section along line 9—9 in FIG. 6;

FIG. 10 a partial section of a variant of the third embodiment;

FIG. 11 a section similar to FIG. 9 through a second variant of the third embodiment;

FIG. 12 a section similar to FIG. 3 through a fourth embodiment;

FIG. 13 a section along line 13—in FIG. 12;

FIG. 14 an enlarged sectional illustration similar to FIG. 13 through a laser-active unit;

FIG. 15 an enlarged plan view of a variant of a laser-active unit;

FIG. 16 an enlarged plan view similar to FIG. 15 of a further variant of a laser-active unit;

FIG. 17 a plan view of a fifth embodiment;

FIG. 18 a section along line 18—18 in FIG. 17;

FIG. 19 an enlarged illustration of areas A and B in FIG. 17;

FIG. 20 a partial illustration of a section similar to FIG. 18 through a variant of the fifth embodiment;

FIG. 21 a sectional illustration similar to FIG. 20 through a further variant of the fifth embodiment;

FIG. 22 a plan view similar to FIG. 17 of a sixth embodiment; and

Figure 24:
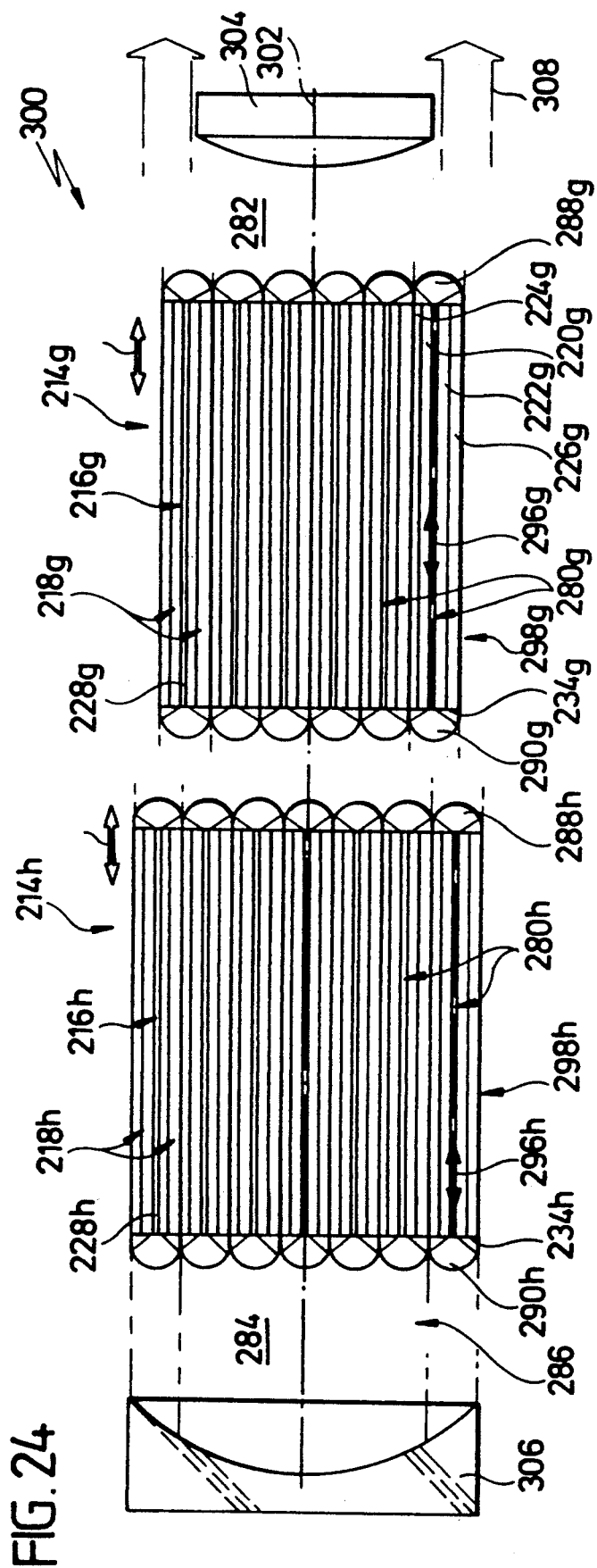

FIG. 23 a second along line 23—23 in FIG. 22;

FIG. 24 a plan view similar to FIG. 22 of a seventh embodiment.

A first embodiment of an inventive solid-state laser, illustrated in FIG. 1, comprises a resonator designated in its entirety 12 and comprising a first excitation section 14 and a second excitation section 16 which are both arranged parallel to one another and symmetrically in relation to an axis 18 and each comprise a path of rays with a parallel beam 20 and 22, respectively, and so the beams 20 and 22 also extend parallel to one another and symmetrically in relation to the axis 18.

These beams 20 and 22, respectively, enter as outer beams 24 and 26, respectively, a coupling section designated in its entirety 28 of the resonator 12 symmetrically in relation to a coupling axis 30 and are reflected in the coupling section by reflection in the direction of the coupling axis 30, preferably imaged towards the coupling axis 30, so the coupling between the two outer beams 24 and 26 beyond the coupling axis 30 results in the joint beam 31.

The two outer beams 24 and 26 thereby form a coupling plane extending through the coupling axis 30 and are reflected by the coupling section 28 of the resonator 12 in this coupling plane towards the coupling axis 30 in order to couple with one another beyond the coupling axis 30 to form the joint beam 31.

Owing to this design of the resonator 12, the first excitation section 14 and the second excitation section 16 are completely coupled with one another and so coherent laser radiation forms in these two excitation sections 14 and 16 beyond the coupling section 28.

The first excitation section is preferably closed off on a side opposite the coupling section 28 by an end mirror 32 and the second excitation section 16 by an end mirror 34, these preferably being flat mirrors both lying in a plane 36 perpendicular to the axis 18.

The coupling section 28, in turn, is preferably formed on its side opposite the excitation sections 14 and 16 by a concave mirror 38 and on its side facing the excitation sections 14 and 16 by a convex mirror 40. The convex mirror 40 extends between the two outer beams 24 and 26 which propagate as straight-line continuation of the beams 20 and 22 into the coupling section 28 past the sides of the convex mirror 40 and impinge upon the concave mirror 38 which reflects onto the convex mirror 40 which then reflects back again to the concave mirror 38, more particularly, parallel to the outer beams 24 and 26. This results in reflection back and forth of the beams 24 and 26 until these reach the coupling axis 30 and pass over the 34 latter into the respective other beam 26 and 24, respectively.

The concave mirror 38 and the convex mirror 40 are preferably designed as the two mirrors of a cylinder resonator, in particular, a confocal cylinder resonator, the resonator axis of which is the coupling axis 30.

It is preferably for both the concave mirror 38 and the convex mirror 40 to have cylindrical mirror surfaces 42 and 44 which are curved in the direction of the coupling plane, but are preferably not curved perpendicular to the coupling plane.

In the case of a cylinder resonator formed by mirrors 38 and 40, the resonator axis is that axis which stands perpendicular on both mirror surfaces 42 and 44.

The excitation sections 14 and 16 each contain a solid-state rod 46 and 48, respectively, which with a longitudinal axis parallel to a first direction 50 and 52, respectively, each extend parallel to the axis 18, with each solid-state rod 46 and 48, respectively, being completely permeated by the respective beam 20 and 22, respectively.

For coupling the laser radiation out of the resonator 12, the end mirror 32, for example, is designed as semi-transmissive mirror which thus reflects the beam 20 only partly and from which there emerges a coupled-out beam 54 which is expanded to a beam with a square cross-section by a cylindrical optical means 56.

It is, however, also conceivable for both the end mirror 32 and the end mirror 34 to be of semitransmissive design and for two coupled-out beams to be allowed to emerge from the resonator 12. As illustrated in FIG. 2, the solid-state rods 46 and 48 are designed as rods with a rectangular cross-section, each solid-state rod having two broad sides 60 and 62 facing each other and two narrow sides 64 and 66 facing each other which, in accordance with the invention, are formed by flat surfaces, with the broad sides 60 and 62 extending perpendicular to the narrow sides 64 and 66.

Each solid-state rod 46 and 48 is, for its part, held in a cooling element designated in its entirety which 68 engages over each solid-state rod 46 and 48, respectively, on both broad sides 60 and 62 and preferably also on the narrow side 66 facing the axis 18 and rests in a thermally contacting manner on the two broad sides 60 and 62 and preferably also on the narrow side 66.

With the narrow side 64 facing away from the axis 18, each of the solid-state rods 46 and 48 faces a light source 70 and 72, respectively, acting as pumping power source, In the simplest case, the light sources 70 and 72 are gas-discharge lamps. Each of the solid-state rods 46, 48 forms with the respective light source 70 and 72, respectively, a laser-active unit 73.

These light sources 70 and 72 are preferably designed so as to emit their light in the form of pumping radiation 74 and 76, respectively, essentially in the direction of the narrow side 64 so the pumping radiation can penetrate the respective solid-state rod 46 and 48, respectively, via the respective narrow side 64, the spacing of the narrow side 66 preferably being selected in the order of magnitude of the penetration depth of the pumping radiation 74 and 76, respectively, in order that the pumping radiation 74 and 76, respectively, will penetrate the solid-state rod 76 and 48, respectively, over its entire expanse in the direction of the broad sides 60 and 62 and hence excite these to an essentially full extent.

In order to also use diverging pumping radiation 74 and 76, respectively, coming from the light sources 70 and 72 as fully as possible for excitation of the respective solid-state rod 46 and 48, respectively, the cooling element 68 is additionally provided with reflector surfaces 78 and 80, respectively, which, in accordance with the invention, extend from each solid-state rod, starting at the level of the respective narrow side 64 on the respective broad sides 60 and 62, respectively, away from the axis 18 with increasing spacing from one another and preferably at an acute angle and symmetrically in relation to a center plane 82 which, for its part, extends through the axis 18 and through the light source 70 as well as through the center of the respective solid-state rod 46 and 48, respectively. By means of these expanding reflector surfaces 78 and 80, respectively, pumping radiation 74 propagating at an acute angle to the center plane 82 is also reflected towards the respective solid-state rod 46 and 48, respectively, and hence used to excite the latter.

The spacing of the broad sides 60 and 62 is chosen in accordance with the heat conductivity of the solid-state rods 46 and 48, respectively, more particularly, such that the heat to be removed from these solid-state rods 46 and 48, respectively, can be conducted away quickly enough for it not to cause excessive heating-up of the solid-state rods 46 and 48, respectively, and hence the known problems caused by the thermal expansion of the solid state rods 46 and 48 no longer occur.

To achieve optimum heat transfer from the broad sides 60 and 62 to the cooing element 68, the solid state rods 46 and 48, respectively, are preferably clamped into the cooling element between two side webs 84 and 86, respectively, which thus rests with pressure on the broad sides 60 and 62. The heat conductivity between the solid-state rods 46 and 48 can be additionally improved by a heat conducting agent, for example, a heat conducting paste being applied between the side webs 84 and 86 and the broad sides 60 and 62.

Optimum thermal contact can be established between the narrow side 66 and the cooling element 68 in the same way. For this purpose, a groove designated in its entirety 88 is preferably provided between the side webs 84 and 86, with the narrow side 66 resting on the groove bottom 90 thereof.

To improve the illumination of the solid-state rods 46 and 48, respectively, a contact surface 92 and 94 of the side webs 84 and 86 is preferably a reflecting design and hence serves as continuation of the respectively reflector surface 78 and 80, respectively, so that all of the pumping radiation 74 and 76, respectively, reflected by the reflector surfaces 78 and 80, respectively, into the groove 88 is also reflected back and forth by these contact surfaces 92 and 94, respectively, and hence optimum illumination of the solid-state rods 46 and 48, respectively, takes place over their entire cross-section.

For optimum removal of the heat into the cooling element, the latter preferably contains cooling channels 96 preferably extending in the longitudinal direction of the cooling element 68, i.e., parallel to the axis 18, and near the contact surfaces 92 and 94 as well as the groove bottom 90.

A good heat conducting material, i.e., for example, copper is used as preferred material for the cooling element 68.

Ruby or neodymium and, for example, also titanium sapphire are preferably used for the solid-state rods 46 and 48, respectively, of this inventive solid-state laser.

A second embodiment of an inventive solid-state layer, illustrated in FIGS. 3 to 5, is, in principle, of exactly the same design as the first embodiment. In particular, a resonator 112 thereof is likewise provided with a first excitation section 14 and a second excitation section 16 both lying with their beams 20 and 22 in a plane which in the coupling section 28 is a coupling plane over which the outer beam 24 couples with the outer beam 26. In contrast with the first embodiment, however, not only two excitation sections 14 and 16 are provided, but instead a plurality of planes 114, 116, 118 and 120 which all extend through the axis 18 and through the coupling axis 30 coaxial with the latter and form a family of planes in relation to the axis 18.

Arranged in each of these planes 114, 116, 118 and 120 are a first excitation section 14 and a second excitation section 16 with their beams 20 and 22.

The coupling section 28 likewise comprises the concave mirror 38 and the convex mirror 40, with the concave mirror 38 having a spherical concave mirror surface 122 and the convex mirror 40 and a convex spherical mirror surface 124, and the mirror surfaces 122 and 124 likewise lying confocally in relation to each other. Hence the coupling section 28 forms a spherical unstable resonator which couples the outer beams 24 and 26 of the respective planes 114, 116, 118 and 120 with one another, but also in the region of the coupling axis 30 the beams of the individual planes 114, 116 and 120 with one another so that, in all, a joint beams 121 with coherent radiation is formed in the resonator 112 with a plurality of first and second excitation sections 14, 16 and with a coupling section 28.

The end mirrors 32 and 34 of the first and second excitation sections 14 and 16 are preferably all of semi-transmissive design so that a plurality of coupled-out beams 126, all arranged axially symmetrically in relation to the axis 18 around the latter, emerges from the resonator 112.

To improve the coupling of the radiation propagating in the respective planes in the resonator 112 between the planes 114, 116, 118 and 120, there is arranged between the coupling section 28 and the excitation sections 14 and 16 a mirror element 128 which, as illustrated in FIG. 5, by means of non-reflective sectors 130, 132, 134 and 136 allows the beams 24 and 26 in the respective planes 114, 116, 118 and 120 to pass, but between these sectors 130, 132, 134 and 136 comprises mirrored sectors 138, 140, 142, and 144 which close off the coupling section 28 in the sector regions between the beams 24 and 26 in order to also permit radiation propagation in these regions in the coupling section 28 and hence optimally couple all outer beams 24 and 26 with one another. The mirrored sectors 138, 140, 142 and 144 are preferably likewise flat mirrors which reflect back in the same way as the end mirrors 32 and 34 which are likewise preferably designed as flat mirrors, in order to also ensure between the outer beams 24 and 26 in the coupling section 28 a parallel path of rays which can thus circulate in the azimuthal direction and pass over into the parallel path of rays of the outer beams 24 and 26.

In the second embodiment, the planes 114, 116, 118 and 120 are preferably arranged at constant angular spacings relative to one another so that the axis 18 and the coupling axis 30 form multiple axes of symmetry for the path of rays in the resonator 112.

As illustrated in FIG. 4, the cooling element 146 is arranged as cylinder coaxially with the axis 18 and comprises grooves 88, with the planes 114, 116, 118 and 120 forming center planes corresponding to the center plane 82 for the arrangement of the solid-state rods 46 and 48 and the arrangement of the light sources 70 and 72. Furthermore, reflector surfaces 78 and 80 are provided in the same way as i the first embodiment, and the reflector surfaces 88 and 78 form successive points 148. In this embodiment, the solid-state rods 46 and 48 are preferably of trapezoidal design, with the broad sides 60 and 62 lying in radial planes extending through the axis 18, while the narrow sides 64 and 66 extend parallel to one another.

For a description of parts of the second embodiment which have the same reference numerals as those of the first embodiment and hence are identical with these with respect to function, reference is to be had to the description and explanation of the function of the first embodiment.

In a third embodiment, illustrated in FIGS. 6 to 9, those parts identical with those of the first and second embodiments have the same reference numerals and so insofar reference is to be had to the description of the first and second embodiments.

In contrast with the second embodiment, as illustrated in FIGS. 7 and 9, a large number of planes 150 corresponding to the planes 114 to 120 is provided. These all form a family of planes extending through the axis 18 and the coupling axis 30 and are at identical angular spacing from one another, and a first and a second excitation section 14 and 16 with solid-state rods 46 and 48, respectively, and beams 20 and 22, respectively, lie in each plane 150.

The resonator 152 comprises in the same way as the resonator 112 a plurality of beams 20 and 22 which are coupled with one another by the joint beam 121 in the coupling section 28 provided with spherical mirror surfaces 122 and 124 via a coupling axis 30 and so in this connection reference is to be had in full to the explanations of the first and second embodiments.

In contrast with the second embodiment, however, the mirror element 128 is replaced by an imaging element 154 illustrated in FIGS. 6, 7 and 8 which, as illustrated in FIGS. 7 and 8, comprises a plurality of cylindrical optical segments 156 seated alongside one another and designed in the form of adjoining annular segments in relation to the axis 18.

Each of these cylindrical optical segments 156 is designed symmetrically in relation to the respective plane 150 and has a convex cylindrical surface 158 facing the coupling section 28 and a concave cylindrical surface 160 facing the respective excitation section 14 and 16, respectively, the two cylindrical surfaces 158 and 160 having such a curvature that a parallel, outer beam 24 and 26, respectively, forming a partial beam of the joint beam 121 and having the shape of an annular segment is narrowed in the azimuthal direction 162 and hence forms the corresponding beam 20 and 22, respectively, which thus extends in the azimuthal direction 162 to a likewise parallel beam over a smaller angular area, and, conversely, a beam 20 extending over a smaller angular area in the azimuthal direction 162 is expanded by the cylindrical surfaces 160 and 158 to an outer beam 24 extending over a larger angular area in the azimuthal direction 162.

Since all of the cylindrical optical segments 156 are preferably designed such that the convex cylindrical surfaces 158 adjoin one another, the path of rays in the resonator 152 can be selected such that all outer beams 24 and 26, respectively, of successive planes 150 touch one another and hence the coupling section 28 comprises beams 24 and 26, respectively, which follow one another directly and adjoin one another as they circulate in the azimuthal direction 162. On the other hand, a shorter extent of the beams 20 and 22, respectively, in the azimuthal direction 162 is achieved with the cylindrical optical segments 156 and so spaces 164 remain between the successive beams 20 and 22, respectively. As a result of this, there also remain between the solid-state rods 46 and 48 located in the respective planes 150 spaces in which the side webs 84 and 86 of the cooling element 166 enclosing the solid-state rods 46 and 48 between them are arranged, the cooling element 166 being of similar design to the cooling element 146, but having grooves 88 which lie closer together so as to permit a larger number of planes 150.

In a modification of the first and second embodiments, as illustrated in FIG. 6, the end mirrors 32 and 34 of the excitation sections 14 and 16 are, furthermore, united to form an annular end mirror 168 comprising mirror surfaces 172 curved in the radial direction 170 in relation to the axis 18, the curvature of the mirror surfaces 172 being toroidal. The curvature of the mirror surfaces 172 is selected such that it compensates a slight expansion of the beams 20 and 22 in the radial direction 170 caused by diffraction effects in the coupling section 28 by reflecting each incident ray of the beams 20 and 22, respectively, back into itself and hence keeping the outer beams 24 and 26 parallel in the coupling section 28.

In contrast with the first and second embodiments, there is preferably provided in the third embodiment, as illustrated in FIG. 9, a single, for example, cylindrical light source 174 which, in particular, can be a cylindrical discharge lamp arranged coaxially with the axis 18. This is preferably also cooled by a cylindrical cooling jacket 176 which is arranged on the side of the light source 174 facing the cooling element 166 and, in the simplest case, comprises a coolant 182 conducted between an outer cylinder wall 178 and an inner cylinder wall 180, the coolant 182 being constantly exchanged and externally cooled.

In the simplest case, the light source 174 is a gas discharge lamp with the gas discharge which takes place being initiated by an electric field strength extending in the radial direction 170.

For the purpose, the light source 174 is provided with an outer electrode 184 and, on the other had, the cooling element 166 can represent the inner electrode.

The light source 174 forms with each of the solid-state rods a laser-active unit 73.

In contrast with the gas discharge by means of a radial, electric field, it is, however, also conceivable for the light source 174, as illustrated in FIG. 10, to be divided up into flat electrodes 186 and 188 which are arranged in the radial direction 170 and between which an electric field strength oriented in the azimuthal direction 162 can be generated in order to initiate therein a gas discharge in a gas-discharge space 190 of the light source 174', this gas discharge preferably being a high-frequency gas discharge.

As an alternative to this, it is also possible for the electrodes 186 and 188 to be omitted and for a gas discharge to then be initiated to couple microwaves to the gas-discharge space 190.

In a further variant of the inventive solution, illustrated in FIG. 11, the reflection surfaces 78 and 80 are drawn from the cooling element 166 up to a row of semiconductor diodes 192, with the row of semiconductor diodes 192 extending parallel to the axis 18, preferably essentially over the length of the solid-state rods 46 and 48, respectively, in this direction. The reflection surfaces 78 and 80 serve to radially conduct the light emitted from the respective row of semiconductors 192 in the direction towards the respectively associated solid-state rod 46 and 48, respectively, so that essentially the total light emitted from the semiconductor diode 192 is guided to the respective solid-state rod 46 and 48, respectively, and serves to excite the latter.

Semiconductor diode rows 192 are preferably arranged in the azimuthal direction 162 around the entire cooling element 166, with their light being guided from the respective reflection surfaces 78 and 80, respectively, to the respective solid-state rod 46 and 48, respectively.

The resonator concepts described on the basis of resonators 12, 122 and 152 could also be modified within the scope of the present invention, for example, the scope of the present invention also allows use of resonator concepts as described in the article "Unstable resonators for annular gain volume lasers" in APPLIED OPTICS, Volume 17, No. 6, Mar. 15, 1978, to which references is expressly made in this connection.

In a fourth embodiment of an inventive solid-state rod, illustrated in FIGS. 12 and 13, the resonator 212 is identical in design to the resonator 112 of the first embodiment and, in addition, the excitation sections 14 and 16 as well as the beams 20 and 22 are arranged in the same way, with two excitation sections 14 and 16 likewise lying in each of the planes 114, 116, 118 and 120.

Moreover, the coupling section 28 is also of identical design and comprises the beams 24 and 26 as well as the coupling axis 30. Therefore, in this connection reference is to be had in full to the statements on the second embodiment.

Furthermore, the concave mirror 38 is also provided in the same way as in the second embodiment with a spherical concave mirror surface 122 and the convex mirror 40 with a convex spherical mirror surface 124. As likewise described in detail in connection with the second embodiment, these cooperate with one another to couple the beams 24 and 26 of the respective planes 114, 116, 118 and 120 with one another to form the joint beam 121.

In addition, the end mirrors 32 and 34 are also designed in the same way as in the second embodiment so that a plurality of coupled-out beams 126 likewise form in axially symmetrical relation to the axis 18 and emerge from the resonator 212.

Finally, the mirror element 128 also acting in the same way as in the second embodiment is provided for coupling the radiation which builds up the resonator 212 and so reference is also to be had in this connection go the statements on the second embodiment.

The fourth embodiment differs from the second embodiment in that instead of the solid-state rods 46 and 48, laser-active units 214 in the form of semiconductor lasers are now seated in the grooves 88 of the cooling element 146.

As illustrated in FIGS. 13 and 14, each of the laser-active units 214 comprises a laser amplification volume 216 with a pumping means designated in its entirety 218 adjoining it on either side thereof. This pumping means 218 comprises in sandwich-like configuration semiconductor layers 220 and 222 of a pn-junction which enclose the laser amplification volume 216 between them and on which there is positioned as contact and cooling area a metal layer 224 and 226, respectively, facing the laser amplification volume 216. The power supply leads to the metal layers 224 and 226.

The laser-active unit 214 is preferably a semiconductor laser in the form of a gallium arsenide laser so that the semiconductor layer 222 is, for example, the p-gallium arsenide layer, the semiconductor layer 220 the n-gallium arsenide layer and the metal layer 226 is supplied with the positive supply voltage and the metal layer 224 with the negative supply voltage.

In the simplest case, the laser amplification volume 216 could be a continuous laser-active layer lying between the semiconductor layers 220 and 222 with its band gap being lowered with respect to the adjacent layers by additional aluminum doping and hence having the lowest band gap. However, in such a case there are problems with the heat dissipation and so the layer amplification volume 216 preferably comprises strip-shaped laser-active regions 228 extending in a first direction 230 parallel to the longitudinal direction 21 and 23 of the beams 20 and 22, respectively.

Arranged between the laser-active regions 228 are laser-inactive regions 232 which in one variant likewise represent a semiconductor layer whose band gap is preferably selected such that this semiconductor layer does not absorb the laser radiation propagating in the respective beam 20 and 22, respectively, i.e., that the band gap of the semiconductor layer is greater than the band gap in the laseractive region. The laser-inactive regions 232 preferably extend between the laser-active regions 228 likewise in strip-shaped configuration in the first direction 230.

Hence the laser amplification volume in the embodiment of the laser-active unit 214 illustrated in FIG. 14 is formed by the sum of the laser-active regions 228 and the laser-inactive regions 232 which both extend in the first direction 230.

In the embodiment of the laser-active unit 214 illustrated in FIG. 14, the laser-active regions 228 and the laser-inactive regions 232 are the same length and so the laser-active unit comprises a front side 234 representing one plane and in the same way a rear side, not illustrated in the drawing, extending parallel to the front side 234. The front side 234 preferably extends perpendicular to the first direction 230.

The strip-shaped laser-active regions 228 are of such dimensions that their narrow side 236 extending between the semiconductor layers 220 and 222 has approximately and expanse of 1 $\mu$m and their broad side 238 extending perpendicular, i.e., parallel to the semiconductor layers 220 and 222, an expanse of approximately 2 $\mu$m. Furthermore, the strip-shaped laser-active regions 228 extending the first direction 230 over a distance of the order of 1 mm.

The narrow side 240 of the laser-inactive regions 232 also has the exactly the same width as the narrow side 236 of the laser-active regions 228, and a broad side 242 of the laser-inactive regions is of such dimensions that it has an expanse of the order of 5 $\mu$m.

The total expanse of the laser amplification volume 216 parallel o the broad sides 238 and 242 in the direction of a height 244 of the laser amplification volume 216 is of the order of 10 mm and so a correspondingly large number of laser-active regions 228 and laser-inactive regions 232 alternate with one another.

The laser-active units 214 are seated in the grooves 88 such that the respective layer amplification volume 216 is penetrated by the beams 20 and 22, respectively, with the beams 20 and 22, respectively, extending with their directions of propagation 21 and 23, respectively, parallel to the first direction 230 of the respective laser-active unit 214. Furthermore, the beams 20 and 22, respectively, have such an expanse in a transverse direction 25 to its direction of propagation 21, 23 that they extend within the laser amplification volume 216 and hence between the semiconductor layers 220 and 222, the width of the narrow sides 236 and 240, respectively, of the laser-active regions 228 and the laser-inactive regions 232, respectively.

The fourth embodiment operates by the beam 20 and 22, respectively, penetrating the laser amplification volume 216, with laser amplification being imparted to the segments of the beams 20 and 22, respectively, passing through a laser-active region 228, whereas no laser amplification is imparted to the other segments passing through the laser-inactive regions 232. Averaged over the respective beam 20 and 22, respectively, the laser amplification is, however, so great that the emerging laser beam has the power of a high-power laser.

Owing to the small dimensions of the successive laser-active regions 228 and laser-inactive regions 223, these act like a phase grid extending in the direction of the height 244 for the beam 20 and 22, respectively, passing through the laser amplification volume 216. For this reason, the laser-active regions 228 and the laser-inactive regions 232 are preferably made of a semiconductor material which has a similar index of refraction. Furthermore, the extent of the laser-active regions 228 and the laser-inactive regions 232 in the direction of the first direction is preferably such that the segments of the respective beams 20 and 22, respectively, passing through these move through the same optical path length so that these have the same phase position after passing through the laser-active regions 228 and the laser-inactive regions 232.

This is either achievable with a planar front side 234 and a planar rear side by the extent of the laser-active regions 228 and the laser-inactive regions 232 in the direction of the first direction 230 being selected accordingly.

Or, alternatively, with the laseractive unit 214' of the variant of the fourth embodiment, illustrated partially and on an enlarged scale in FIG. 15, the constant phase position of the segments of the beam 20 and 22, respectively, penetrating the laser-active regions 228' and of the segments of the beams 20 and 22, respectively, penetrating the laser-inactive regions 232' is achievable by these segments having a different length in the first direction 230. This is achievable by, for example, the front side 234 no longer being one plane but, for example, having grooves 248 lying between the laser-active regions 228' so that end faces 250 of the laser-active regions 228 lie in one plane and end faces 252 of the laser-inactive regions 232' in another plane, with the latter plane being offset in the first direction 230 in relation to the one first mentioned.

Owing to the spacing of the two planes, the above-mentioned same phase position of the segments of the beams 20 and 22, respectively, passing through the laser-active regions 228 and the laser-inactive regions 232' can be achieved in the variant 214' of the laser-active unit.

In a further variant 214" of the laser-active unit, illustrated partially in FIG. 16, the laser-inactive regions 232" are produced as material-free channels 254 which extend parallel to the laser-active regions 228" so that segment of the respective laser beam 20 and 22, respectively, run either through one of the laser inactive regions 228" with a pumped semiconductor layer or through one of the channels 254 produced material by etching.

With this variant of the laser-active unit 214", too, the aim is preferably for the phase position of the segments passing through the laser-active regions 228" to be identical with that of the segments of the beams 20 and 22, respectively, passing through the laser-inactive regions 232", i.e., through the channels 254 so that the expanse of the laser-active regions 228" in the first direction 230 and the expanse of the channels 254 in the first direction 230 are likewise coordinated.

In all of the variants of the inventive laser-active unit, pumping of the laser-active regions 228, 228' and 228" is carried out in the usual way for semiconductor lasers with the pumping means 218 and is described, for example, in Principles of Lasers, 3rd. Ed., by O. Svelto, Plenum Press, New York 1989 and/or in Handbook of Solid State Lasers, by P.K. Cheo, Marcel Dekker Inc., New York 1989.

For the rest, the fourth embodiment of the inventive solution operates in the same way as the second embodiment and so reference is to be had in full in this connection to the statements on the second embodiment.

In the same way as described by way of example in connection with the fourth embodiment in comparison with the second embodiment, replacement of the solid-state rods 46 and 48 by laser-active units 214, 214' and 214" is also possible in the first and third embodiments.

In a fifth embodiment of the inventive solid-state laser, illustrated in FIG. 17, the optical resonator designated in its entirety 262 is represented as half of a confocal unstable resonator. Herein a convex mirror 264 and a concave mirror 266 are arranged facing one another and extend from an optical axis 268 of this resonator 262 in a transverse direction 270, the expanse of the convex mirror 264 in this transverse direction 270 being shorter than that of the concave mirror 266 so that a laser beam 272 starting from the concave mirror 266 emerges from the resonator 262 at the side of the convex mirror 264.

The confocal mirror surface 274 and 276, respectively, of the convex mirror 264 and the concave mirror 266 are preferably designed as cylindrical mirror surfaces and hence extend in a height direction 278 perpendicular to the transverse direction 270 and perpendicular to the optical axis 268 parallel to one another, as illustrated in FIG. 18.

Such as confocal resonator with cylindrical mirrors is described in detail, for example, in German patent 37 29 053 or in A.E. Siegman, Unstable Optical Resonators, Appl. Optics, 13, pages 353-367 (1974).

A plurality of excitation sections 280 is arranged between the mirrors 264 and 266 in the beam path of the resonator 262. These excitation sections 280 lie between two coupling sections 282 and 284 immediately adjoining the mirrors 264 and 266, respectively. A joint beam of the resonator 262 is present in these coupling sections 282 and 284. This joint beam 286 is coherent and has a beam path like that known in confocal unstable resonators. The joint beam 286, for its part, is made up of partial beams 292 lying directly alongside one another in the transverse direction 270. For each excitation section 280, one of the partial beams 292 of the joint beam 286 is imaged by means of an optical element 288 and 290, respectively, in the form of a cylindrical optical means on either side of the excitation section 280 into a beam 294 in this excitation section which extends with its longitudinal direction 296 between the two cylindrical optical means 288 and 290. The cylindrical optical means 288 and 290 image the partial beam 292 into the beam 294 such that its extent in the transverse direction 25 parallel to the transverse direction 270 is less than the extent of the partial beam 292 in the transverse direction 270.

As illustrated in FIGS. 17 and 19, there is arranged in each excitation section 280 a laser-active unit 214 whose laser amplification volume 216 is penetrated by the beam 294 with an essentially parallel beam path, the first direction 230 of the laser amplification volume 216 extending parallel to the direction of propagation 296 of the beam 294. Furthermore, the height 244 of the laser amplification volume 216 extends parallel to the height direction 278. Hence the extent of the beam 294 in the transverse direction 25 is less than or equal to the expanse of the narrow side 236 of the laser-active regions 228. Furthermore, the width of the laser-active unit 214 in the transverse direction 270 corresponding at the most to the width of the respective partial beam 292 in this direction.

In the fifth embodiment, a plurality of laser-active units 214 are placed close together and form a laser-active block 298, the laser amplification volume 216 of the individual laser-active units 214 being arranged in succession at constant, equal spacings in the transverse direction 270.

The cylindrical optical means 288 and 290 are each designed such that, as mentioned previously, they image a partial beam 292 with an essentially parallel beam path and a certain extent in the transverse direction 270 into the beam 294 of the respective excitation section 280 with an essentially parallel beam path, the extent of each partial beam 292 in the transverse direction 270 being such that the following partial beam 292 immediately adjoining it is detected by the following cylindrical optical means 288 and 290, respectively, and hence, in all, the joint beam 286 is imaged in the region of the laser-active block 298 continuously into the beams 294 so that the block 298 appears transparent for the joint beam 286 although there are non-transparent regions between the individual beams 294 of the individual excitation sections 280 but owing to the imaging by the cylindrical optical means 288 and 290, these do not have a shading influence on the joint beam 286.

Furthermore, in the design of the cylindrical optical means described hereinabove, the beam divergence upon emergence of the beam 294 from the laser amplification volume 216 owing to the small width of the beam 294 in the transverse direction 25 has to be taken into consideration and so the scattering effect of the cylindrical optical means 298 and 290 has to be correspondingly smaller dimensions.

The extent of the joint beam 286 in the height direction 278 is selected such that it is at the most equal to or less than the extent of the laser amplification volume 216 in the direction of the height 244. Moreover, the cylindrical optical means 288 and 290 are of such dimensions that, for their part, they extend at least over the extent of the joint beam 286 in the height direction 278 and do, therefore, also not contribute to any switching-off of the joint beam in this direction.

The laser-active units 214 which form the laser block 298 can be designed in the same way as in the fourth embodiment or its variants so that the block 298 can be made up of the laser-active units 214, 214'or 214".

Therefore, regarding the design of the laser-active units 214, reference is to be had in full to the statements on the fourth embodiment in this context.

In a variant of the fifth embodiment, illustrated in FIG. 20, several laser-active units 214a and 214b are arranged one behind the other in each excitation section 280 in order to increase the amplification in the individual excitation sections 280 by enlarging the extent of the laser-active regions in the first direction 230. In this variant, in the simplest case, the laser-active regions 228 are arranged in alignment with one another and the laser-inactive regions 232 in alignment with one another so that the optical lengths of the laser-active regions 228 add up. This does, of course, require the dimensions of the laser-active regions with respect to their narrow sides 236 and their broad sides 238 as well as the dimensions of the laser-inactive regions 232 with respect to their narrow sides 240 and their broad sides 242 to be identical.

In a further variant, illustrated in FIG. 21, two laser-active units 214c and 214d are likewise provided in each excitation section 280, the laser-active unit 214d adjoining the layer-active unit 214c being arranged such that its laser-active regions 228 are not in alignment with the laser-active regions 228 of the laser-active unit 214c but instead with the laser-inactive regions 232 of the laser-active unit 214d and, conversely, the laser-active regions 232 with the laser-active regions 228 of the laser-active unit 214c.

In this case, it is particularly advantageous for the cross-sections of the regions in respective alignment with one another to be identical so that, in all, each segment of each beam 294 passes one time through a laser-inactive regions 232 and another time through a laser-active region 228, and the laser-active regions 228 and the laser-inactive regions 232 is both laser-active units 214d and 214c preferably have equally long dimensions in the first direction 230 so that after passing through the two laser-active units 214c and 214d, all of the segments of the beam 214 have the same phase position.

Common to both variants of the fifth embodiment is, however, always that the two laser amplification volumes 216 of the two laser-active units 214a and b as well as 214c and d are in respective alignment with one another, have the same cross-section and the two layer amplification volumes 216 in alignment with one another are penetrated by a single beam 294.

In a sixth embodiment, illustrated in FIGS. 22 and 23, the resonator 300 is designed as confocal, unstable resonator comprising spherical mirrors 304 and 306 arranged symmetrically in relation to a resonator axis 302. The mirror 304 is a convex mirror and the mirror 306 a concave mirror, and the concave mirror 306 extends beyond the convex mirror 304 so that a ring-shaped laser beam 308 with rays running parallel to the resonator axis 302 emerges from the resonator 300 past the convex mirror 304. Hence the joint beam 286 extends symmetrically from the resonator axis 302 as far as the emerging laser beam 308. Such resonators are described in detail in A.E. Siegman, Unstable Optical Resonators, Appl. Optics, 13, pages 353-367 (1974).

The extent of the joint beam in the transverse direction 270 is, therefore, identical with that in the height direction 278.

Two block 298e and 298f are provided in the sixth embodiment, illustrated in FIG. 22 and FIG. 23, and their laser amplification volumes 216a and 216b are respectively arranged in an excitation section 280e and 280f and are penetrated by a beam 294e and 294f of the respective excitation section 280e and 280f. Each of the excitation sections 280e and 280f is provided on either side thereof with a cylindrical optical means 288e, 290e and 288f, 290f, respectively, which image the beam 294e and 294f, respectively, in the respective excitation section 280e and 280f, respectively, into the joint beam 286 so that the joint beam 286 is, in turn, also present between the two excitation sections 280e and 280f. Moreover, in the sixth embodiment, the laser excitation volumes 216e and 215f are arranged such that the laser excitation volume 216e stands parallel to the height direction 278 but the laser excitation volume 216f parallel to the transverse direction 270. In the same way, the cylindrical optical means 288e, 290e and 288f, 290f are arranged in tilted relation to one another through 90° respectively. Furthermore, the extent of both laser-active blocks 298e and 298f in the transverse direction 270 is preferably selected such that this identical.

Hence a homogenization of the laser amplification in the joint beam 286 is achieved with the arrangement according to the sixth embodiment where one time the width of the partial beam 292 parallel to the transverse direction 270 is reduced by imaging by the cylindrical optical means 288e, 290e and another time the extent of parts of the partial beam 292 in the height direction height 278 is compressed by the cylindrical optical means 288f, 290f owing to the optical imaging by the cylindrical optical means 288f, 290f.

In a seventh embodiment, illustrated in FIG. 24, the laser amplification volumes 216 of the block 298g and h are aligned parallel to one another but are offset in relation to one another in the transverse direction 270 such that each laser amplification volume 216h is seated between two laser amplification volumes 216g. In the same way, the optical elements 288g, 290g and 288h, 290h are also offset in relation to one another in the transverse direction 270 so that, for example, part of the rays of adjacent beams 294g is imaged into the beam 294h by each optical element 288h.

In the fifth, sixth and seventh embodiments, it is likewise possible for the laser-active units 214, 214' and 214" to be replaced by the solid-state rods 46 and 48, with optical pumping occurring in the direction of the height direction 278, for example, in the fifth and seventh embodiments.

I claim;

1. Solid-state laser comprising a laser-active unit with a laser amplification volume (46, 48, 216) extending in a first direction in a solid, a pump means (174, 192, 218) associated with said laser amplification volume (46, 48, 216) for exciting said laser amplification volume and a resonator (152, 262, 300) with an excitation section (14, 16, 280) arranged between its resonator mirrors and a beam (20, 22, 294) extending in a direction of propagation (21, 23 296) in said excitation section and thereby penetrating said laser amplification volume (46, 48, 216) in said first direction (50, 52, 230), characterized in that at least two excitation sections (14, 16, 218) are provided, each having one laser amplification volume (46, 48, 216), in that said beams (20, 22, 294) of said excitation sections (14, 16, 280) extend in spaced relation to one another, in that said resonator (152, 262) has a coupling section (28, 282, 284) containing a coherent joint beam (121, 286) of said resonator (152, 262), the cross-section thereof being comprised of several partial beams (24, 26, 292), and in that an optical element (156, 288, 290) is arranged between said coupling section (28, 282, 284) and each excitation section (14, 16, 280) for imaging one of said partial beams (24, 26, 292) of said joint beam (121, 286) into one of said beams (20, 22, 294) extending in spaced relation to one another in said excitation sections (14, 16, 280).

2. Solid-state laser as defined in claim 1, characterized in that said partial beams (24, 26, 292) form a joint beam (121, 286) which is coherent in the cross-sectional direction.

3. Solid-state laser as defined in claim 1, characterized in that said optical element (156, 288, 290) images the respective partial beam (24, 26, 292) into said beam (20, 22, 294) such that the latter is narrowed in a cross-sectional direction (162, 270) in relation to said partial beam (24, 26, 292).

4. Solid-state laser as defined in claim 3, characterized in that said laser-active unit has in said cross-sectional direction a width which corresponds at the most to a width of said partial beam imaged by said optical element onto said beam in said cross-sectional direction.

5. Solid-state laser as defined in claim 4, characterized in that said optical elements (156, 288, 290) of excitation sections (14, 16, 280) lying alongside one another adjoin one another and image partial beams (24, 26, 292) of said joint beam (121, 286) immediately adjoining one another essentially continuously into said beams (20, 22, 294) lying alongside one another and in spaced relation to one another.

6. Solid-state laser as defined in claim 4, characterized in that said laser-active unit has supply elements arranged in said cross-sectional direction beside said amplification volume for the latter.

7. Solid-state laser as defined in claim 1, characterized in that said optical element comprises a cylindrical optical means for each beam.

8. Solid-state laser as defined in claim 1, characterized in that said optical element images parallel rays of said joint beam into quasi-parallel ray of said beam.

9. Solid-state laser as defined in claim 1, characterized in that said laser amplification volumes are spaced from one another.

10. Solid-state laser as defined in claim 9, characterized in that said laser amplification volumes (46, 48, 216) are arranged at regular spacings from one another.

11. Solid-state laser as defined in claim 1, characterized in that said beams penetrating different laser amplification volumes run parallel to one another.

12. Solid-state laser as defined in claim 1, characterized in that each layer amplification volume is cooled on at least one side extending parallel to said beam.

13. Solid-state laser as defined in claim 12, characterized in that said cooled side is the side (60, 62, 238) facing said adjacent laser amplification volume (46, 48, 216).

14. Solid-state laser as defined in claim 1, characterized in that each laser amplification volume is excitable from at least one excitation side extending parallel to said beam.

15. Solid-state laser as defined in claim 1, characterized in that said laser amplification volume is formed by an optically excitable solid-state rod.

16. Solid-state laser as defined in claim 15, characterized in that said pumping means (70, 72, 174, 192) irradiates said solid-state rod from one side.

17. Solid-state laser as defined in claim 16, characterized in that the pumping power impinges on one narrow side of said solid-state rod.

18. Solid-state laser as defined in claim 15, characterized in that at least one broad side of said solid-state rod is cooled.

19. Solid-state laser as defined in claim 15, characterized in that said solid-state rod has an essentially four-cornered cross-section with two broad sides extending essentially perpendicular to two narrow sides thereof.

20. Solid-state laser as defined in claim 15, characterized in that said solid-state rod is coolable by contact with a flow-free material.

21. Solid-state laser as defined in claim 20, characterized in that said solid-state rod is cooled by contact with a cooling element.

22. Solid-state laser as defined in claim 21, characterized in that said cooling element is surrounded by said pumping power source.

23. Solid-state laser as defined in claim 21, characterized in that said cooling element (68, 146, 166) rests against said solid-state rod (46, 48) with a press fit.

24. Solid-state laser as defined in claim 21, characterized in that said cooling element carries said solid-state rod.

25. Solid-state laser as defined in claim 21, characterized in that said laser amplification volume is seated with two broad sides and a narrow side in a groove of said cooling element.

26. Solid-state laser as defined in claim 15, characterized in that said solid-state rod is coolable on sides thereof facing one another.

27. Solid-state laser as defined in claim 15, characterized in that a plurality of solid-state rods are adapted to be acted upon with pumping power on their sides that face away from one another.

28. Solid-state laser as defined in claim 15, characterized in that elements are provided for concentrating the pumping power onto said solid-state rods.

29. Solid-state laser as defined in claim 28, characterized in that said elements (78, 80) for concentrating said pumping power deflect onto said solid-state rods (46, 48) electromagnetic radiation which has been emitted by said pumping power source (70, 72, 174, 192) into a solid angle.

30. Solid-state laser as defined in claim 28, characterized in that said elements for concentrating said pumping power are reflectors.

31. Solid-state laser as defined in claim 28, characterized in that intermediate webs of said cooling element are designed as said elements concentrating said pumping power onto said solid-state rods.

32. Solid-state laser as defined in claim 15, characterized in that said pumping power means comprise a gas-discharge lamp.

33. Solid-state laser as defined in claim 32, characterized in that a gas discharge is generated in said gas-discharge lamp (174) by a field extending essentially radially in relation to the axis thereof.

34. Solid-state laser as defined in clam 32, characterized in that a gas discharge is generated in said gas-discharge lamp (174) by a field extending azimuthally in relation to the axis thereof.

35. Solid-state laser as defined in claim 32, characterized in that gas discharge can be generated in said gas-discharge lamp with high-frequency.

36. Solid-state laser as defined in claim 15, characterized in that said pumping power means are comprised of single pumping power sources.

37. Solid-state laser as defined in claim 15, characterized in that said pumping power means comprise semiconductor diodes.

38. Solid-state laser as defined in claim 1, characterized in that said laser amplification volume is that of a laser-active unit of a semiconductor laser assembly.

39. Solid-state laser as defined in claim 38, characterized in that several laser-active regions (228) are provided in each laser amplification volume (216).

40. Solid-state laser as defined in claim 39, characterized in that said laser-active regions (228) are arranged in spaced relation to one another.

41. Solid-state laser as defined in claim 40, characterized in that laser-inactive regions (232) are arranged in spaced between laser-active regions (228).

42. Solid-state laser as defined in claim 41, characterized in that said laser-inactive regions (232) are of transparent design for said beam (20, 220, 294).

43. Solid-state laser as defined in claim 42, characterized in that said laser-inactive regions (232) are in the form of semiconductor layer regions but with an increase band gap in relation to said laser-active regions.

44. Solid-state laser as defined in claim 42, characterized in that said laser-inactive regions (232) are in the form of material-free channels (254).

45. Solid-state laser as defined in claim 42, characterized in that the optical length of said laser-active and said laser-inactive regions is of such dimensions that the parts of said beam penetrating these differ in phase by an integral multiple of 2.

46. Solid-state laser as defined in claim 1, characterized in that the same partial beam, imaged as one of said beams extending in a direction of propagation in said excitation section, penetrates two laser amplification volumes of two laser-active units, said laser amplification volumes being arranged in succession in the direction of propagation of said one said beam.

47. Solid-state laser as defined in claim 46, characterized in that said laser-active units (214) are arranged either immediately one behind the other or in the form of two excitation sections (280) between which imaging into a partial beam again takes place.

48. Solid-state laser as defined in claim 46, characterized in that said laser-active regions are in alignment with one another.

49. Solid-state laser as defined in claim 46, characterized in that said laser-active regions of different laser-active units are arranged in off-set relation to one another.

50. Solid-state laser as defined in claim 46, characterized in that said laser-active units are arranged in turned relation to one another about an axis parallel to said direction of propagation.

51. Solid-state laser as defined in claim 46, characterized in that several laser-active units are arranged alongside one another in sandwich-like configuration.

52. Solid-state laser as defined in claim 51, characterized in that said laser amplification volume is formed by an optically excitable solid-state rod.

53. Solid-state laser as defined in claim 51, characterized in that said laser amplification volume is that of a laser-active unit of semiconductor laser assembly.

54. Solid-state laser comprising a resonator, at least one laser amplification volume arranged in said resonator and a pumping means for exciting said laser amplification volume, characterized in that said resonator (12, 112, 152) is a coupled resonator, in that said resonator (12, 112, 152) has two elongated excitation sections (14, 16), one of said laser amplification volumes (46, 48, 216) being arranged in their beam (20, 22), respectively, in that said resonator (12, 112, 152) has a coupling section (28) which the beams of said excitation sections (14, 16) enter as outer beams (24, 26) extending in spaced relation to one another and which couples said excitation sections (14, 16) with one another by displacing said outer beams (24, 26) in the plane defined by these to a coupling axis (30) lying between these and beyond this coupling axis (30), and in that said laser amplification volumes (46, 48, 216) are cooled on a side (60, 62, 66) extending along said beam and are excitable by said pumping means (70, 72, 174, 192, 218) from a side (64, 238) extending along said beam.

55. Solid-state laser as defined in claim 54, characterized in that said coupling section (28) comprises the beam path of an unstable resonator.

56. Solid-state laser as defined in claim 54, characterized in that said outer beams lie symmetrically in relation to said coupling axis.

57. Solid-state laser as defined in claim 54, characterized in that said coupling section comprises a mirror which reflects towards said coupling axis and a mirror which reflects away from said coupling axis.

58. Solid-state laser as defined in claim 57, characterized in that said coupling axis is an axis of symmetry of said mirrors of said coupling section.

59. Solid-state laser as defined in claim 57, characterized in that said mirrors of said coupling section have cylindrical mirror surfaces.

60. Solid-state laser as defined in claim 57, characterized in that said mirrors of said coupling section are shaped so as to have spherical mirror surface and extend symmetrically with respect to rotation around said coupling axis.

61. Solid-state laser as defined in claim 57, characterized in that both of said mirrors (38, 40) displace said outer beams (24, 26) in the direction toward said coupling axis (30) and image these in reduced size towards it.

62. Solid-state laser as defined in claim 57, characterized in that said mirror reflecting towards said coupling axis protrudes with its active region in the radial direction in relation to said coupling axis beyond the active region of said mirror reflecting away from said coupling axis and is acted upon by said outer beams in this protruding region.

63. Solid-state laser as defined in claim 54, characterized in that said excitation sections are closed off by end mirrors on each side facing away from said coupling section.

64. Solid-state laser as defined in claim 63, characterized in that said end mirrors (32, 34, 168) reflect said beams (20, 22) in said excitation sections (14, 16) into said coupling section (28).

65. Solid-state laser as defined in claim 63, characterized in that said end mirrors comprise a curvature which compensates expansion of said beam in said excitation section and reflects the radiation coming from said coupling section back into itself.

66. Solid-state laser as defined in claim 65, characterized in that said end mirrors closing off said excitation sections are joined together to form a mirror ring.

67. Solid-state laser as defined in claim 54, characterized in that several outer beams are provided and these are respectively arranged in different planes extending through said coupling axis and continue respectively in corresponding excitation sections.

68. Solid-state laser as defined in claim 67, characterized in that said outer beams form annular segments in relation to said coupling axis.

69. Solid-state laser as defined in claim 68, characterized in that said coupling section is closed off in those annular segments in which there are no incident outer beams from said excitation sections by mirrors which reflect back.

70. Solid-state laser as defined in claim 67, characterized in that the sum of all outer beams essentially forms a closed annulus in said coupling section.

71. Solid-state laser as defined in claim 54, characterized in that an optical element is provided between said coupling section and said excitation sections for imaging said outer beams onto said beams in said excitation sections.

72. Solid-state laser as defined in claim 71, characterized in that said optical element comprises a cylindrical optical means (156).

73. Solid-state laser as defined in claim 72, characterized in that said cylindrical optical means comprises a cylindrical, optical annular segment (156) which images said outer beam (24, 26) forming an annular segment in said coupling section (28) onto a beam (20, 22) narrower in said azimuthal direction (162) in relation to said coupling axis (30) in said excitation section (14, 16).

74. Solid-state laser as defined in claim 73, characterized in that the cylindrical, optical annular segments (156) supplement one another to form an annulus (154).

* * * * *

UNITED STATES PATENT AND TRADEMARK OFFICE
CERTIFICATE OF CORRECTION

PATENT NO. : 5,206,874
DATED : April 27, 1993
INVENTOR(S) : Opower

It is certified that error appears in the above-identified patent and that said Letters Patent is hereby corrected as shown below:

On title page, item [73] Assignee: should read as follows:

-- Deutsche Forschungsanstalt fuer Luft- und Raumfahrt e.V. --

Signed and Sealed this

Twenty-second Day of March, 1994

Attest:

BRUCE LEHMAN

Attesting Officer          Commissioner of Patents and Trademarks